United States Patent
Bian et al.

(10) Patent No.: US 11,126,019 B2
(45) Date of Patent: Sep. 21, 2021

(54) RECONFIGURABLE OPTICAL ANTENNA COUPLER

(71) Applicant: GLOBALFOUNDRIES U.S. Inc., Santa Clara, CA (US)

(72) Inventors: Yusheng Bian, Ballston, NY (US); Ajey Poovannummoottil Jacob, Watervliet, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 117 days.

(21) Appl. No.: 16/718,561

(22) Filed: Dec. 18, 2019

(65) Prior Publication Data
US 2021/0191162 A1 Jun. 24, 2021

(51) Int. Cl.
*G02F 1/01* (2006.01)
(52) U.S. Cl.
CPC ............ *G02F 1/0147* (2013.01); *G02F 1/011* (2013.01); *G02F 1/0126* (2013.01); *G02F 2201/06* (2013.01)
(58) Field of Classification Search
None
See application file for complete search history.

(56) References Cited

U.S. PATENT DOCUMENTS

| | | | | |
|---|---|---|---|---|
| 2010/0322555 A1* | 12/2010 | Vermeulen | ............... | G02B 6/34 385/28 |
| 2012/0207428 A1* | 8/2012 | Roelkens | ............. | G02B 6/2793 385/14 |

OTHER PUBLICATIONS

DeRose et al., "Electronically controlled optical beam-steering by an active phased array of metallic nanoantennas," Optics Express, vol. 21, No. 4, Feb. 25, 2013.
Dregely et al., "Imaging and steering an optical wireless nanoantenna link," Nature Communications, Jul. 4, 2014.
Earl et al., "Tunable optical antennas enabled by the phase transition in vanadium dioxide," Optics Express, vol. 21, No. 22, Nov. 4, 2013.
Forouzmand and Mosallaei, "Tunable two dimensional optical beam steering with reconfigurable indium tin oxide plasmonic reflectarray metasurface," Journal of Optics, vol. 18, 2016.
Giewont et al., "300-mm Monolithic Silicon Photonics Foundry Technology," IEEE Journal of Selected Topics in Quantum Electronics, vol. 25, No. 5, Sep./Oct. 2019.
(Continued)

*Primary Examiner* — Chad H Smith
(74) *Attorney, Agent, or Firm* — Hoffman Warnick LLC

(57) ABSTRACT

One optical antenna coupler includes a base body having a first waveguide and a second waveguide and a plurality of antenna coupler elements positioned above an upper surface of the base body that are adapted to be irradiated by an incident light. The plurality of antenna coupler elements includes at least one variable optical characteristics (VOC) antenna coupler element that comprises a VOC material, wherein the at least one VOC antenna coupler element is operatively coupled to a first energy source. The VOC antenna coupler element is adapted to be transitioned from a metallic state to an insulator state and vice versa. In the metallic state, substantially all of the incident light is directed out of the optical antenna coupler via the first waveguide and, in the insulator state, substantially all of the incident light is directed out of the optical antenna coupler via the second waveguide.

20 Claims, 23 Drawing Sheets

(56) References Cited

OTHER PUBLICATIONS

Iyer et al., "Reconfigurable Semiconductor Phased-Array Metasurfaces," ACS Photonics, 2:1077-84, Jun. 17, 2015.
Kato et al., "Current-driven phase-change optical gate switch using indium-tin-oxide heater," Applied Physics Express 10, 072201, 2017.
Pakizeh and Kall, "Unidirectional Ultra-compact Optical Nano-antennas," Department of Applied Physics, Chalmers University of Technology, Goeborg 412 96, Sweden.
Pernice and Bhaskaran, "Photonic non-volatile memories using phase change materials," Appl. Phys. Lett., 101, 171101, 2012.
Seo et al., "Active Terahertz Nanoantennas Based on VO2 Phase Transition," Nano Letters, 10:2064-68, 2010.
U.S. Appl. No. 16/199,727 entitled "Mutiple-Layer Arrangements Providing Switchable Optical Components," filed Nov. 26, 2018.
U.S. Appl. No. 16/199,811 entitled "Switchable and Reconfigurable Grating Couplers," filed Nov. 26, 2018.
U.S. Appl. No. 16/525,878 entitled "Laser with a Gain Medium Layer Dopedwith a Rare Earth Metal with Upper and Lower Light-Confining Features," filed Jul. 30, 2019.

\* cited by examiner

RECONFIGURABLE OPTICAL ANTENNA COUPLER

BACKGROUND

Field of the Invention

The present disclosure generally relates to various novel embodiments of a reconfigurable on-chip optical antenna coupler, various novel methods of making such a device and photonic integrated circuit (PIC) products comprising such a device.

Description of the Related Art

Photonics chips are used in many applications and systems including, but not limited to, data communication systems and data computation systems. A photonics chip integrates optical components (such as waveguides and bends) and electrical components (such as electrical circuits that employ field effect transistors) into a unified platform. An optical coupler is an optical component that is used to couple light from a light source, such as a fiber optic cable or a laser, to a waveguide.

The present disclosure is generally directed to various novel embodiments of a reconfigurable optical antenna coupler, various novel methods of making such a device and PIC products comprising such a device.

SUMMARY

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present disclosure is directed to various novel embodiments of a reconfigurable optical antenna coupler, various novel methods of making such a device and PIC products comprising such a device. One illustrative optical antenna coupler disclosed herein includes a base body that comprises a first waveguide and a second waveguide, and a plurality of antenna coupler elements positioned above an upper surface of a base body that are adapted to be irradiated by an incident light. In this illustrative example, the plurality of antenna coupler elements comprises at least one variable optical characteristics (VOC) antenna coupler element that comprises a VOC material, wherein the at least one VOC antenna coupler element is operatively coupled to a first energy source. The at least one VOC antenna coupler element is adapted to be transitioned from a metallic state to an insulator state and vice versa, wherein, in the metallic state, substantially all of the incident light is directed out of the optical antenna coupler via the first waveguide while substantially no amount of the incident light is directed out of the optical antenna coupler via the second waveguide and wherein, in the insulator state, substantially all of the incident light is directed out of the optical antenna coupler via the second waveguide while substantially no amount of the incident light is directed out of the optical antenna coupler via the first waveguide.

BRIEF DESCRIPTION OF THE DRAWINGS

The disclosure may be understood by reference to the following description taken in conjunction with the accompanying drawings, in which like reference numerals identify like elements, and in which.

Figure 1:
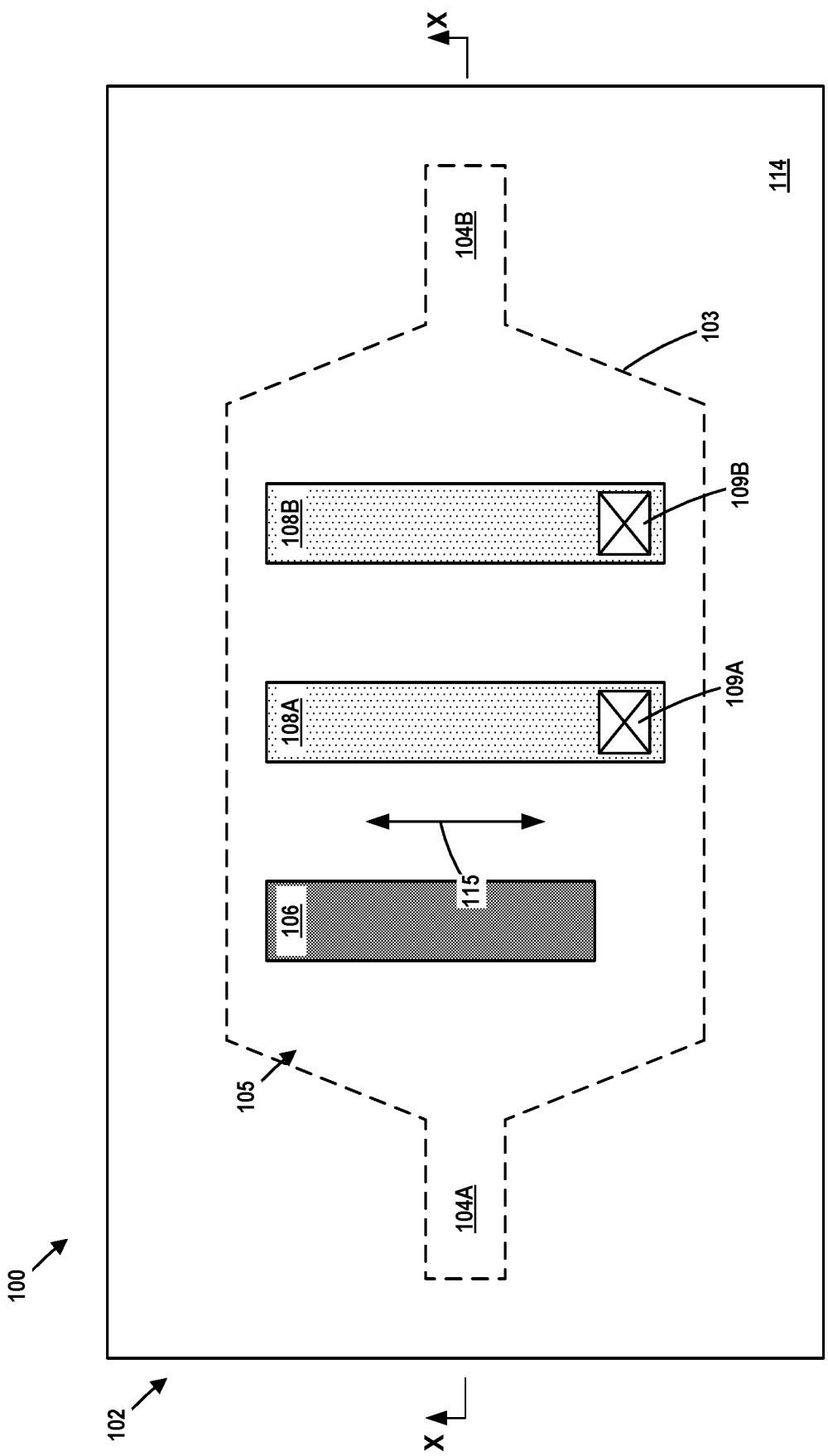
FIGS. 1-23 depict various novel embodiments of a reconfigurable optical antenna coupler, various novel methods of making such a device and PIC products comprising such a device. The drawings are not to scale.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase. As will be readily apparent to those skilled in the art upon a complete reading of the present application, the presently disclosed method may be applicable to a variety of products, including, but not limited to, logic products, memory products, etc. With reference to the attached figures, various illustrative embodiments of the methods and devices disclosed herein will now be described in more detail. The various components, structures and layers of material depicted herein may be formed using a variety of different materials and by performing a variety of known process operations, e.g., chemical vapor deposition (CVD), atomic layer deposition (ALD), a thermal growth process, spin-coating techniques, masking, etching, etc. The thicknesses of these various layers of material may also vary depending upon the particular application.

FIGS. 1-23 depict various novel embodiments of a reconfigurable optical antenna coupler 100, various novel methods of making such a device and PIC products comprising such a device. In the examples depicted herein, the optical antenna coupler 100 will be formed above a semiconductor substrate 102. The substrate 102 may have a variety of configurations, such as a semiconductor-on-insulator (SOI) shown in FIG. 2. Such an SOI substrate 102 includes a base semiconductor layer 102A, a buried insulation layer 102B positioned on the base semiconductor layer 102A and an active semiconductor layer 102C positioned above the buried insulation layer 102B, wherein the optical antenna coupler 100 will be formed in and above the active semiconductor layer 102C. Alternatively, the substrate 102 may have a simple bulk configuration. The substrate 102 may be made of silicon or it may be made of semiconductor materials other than silicon. Thus, the terms "substrate" or "semiconductor substrate" should be understood to cover all semiconductor materials and all forms of such materials.

Figure 2:
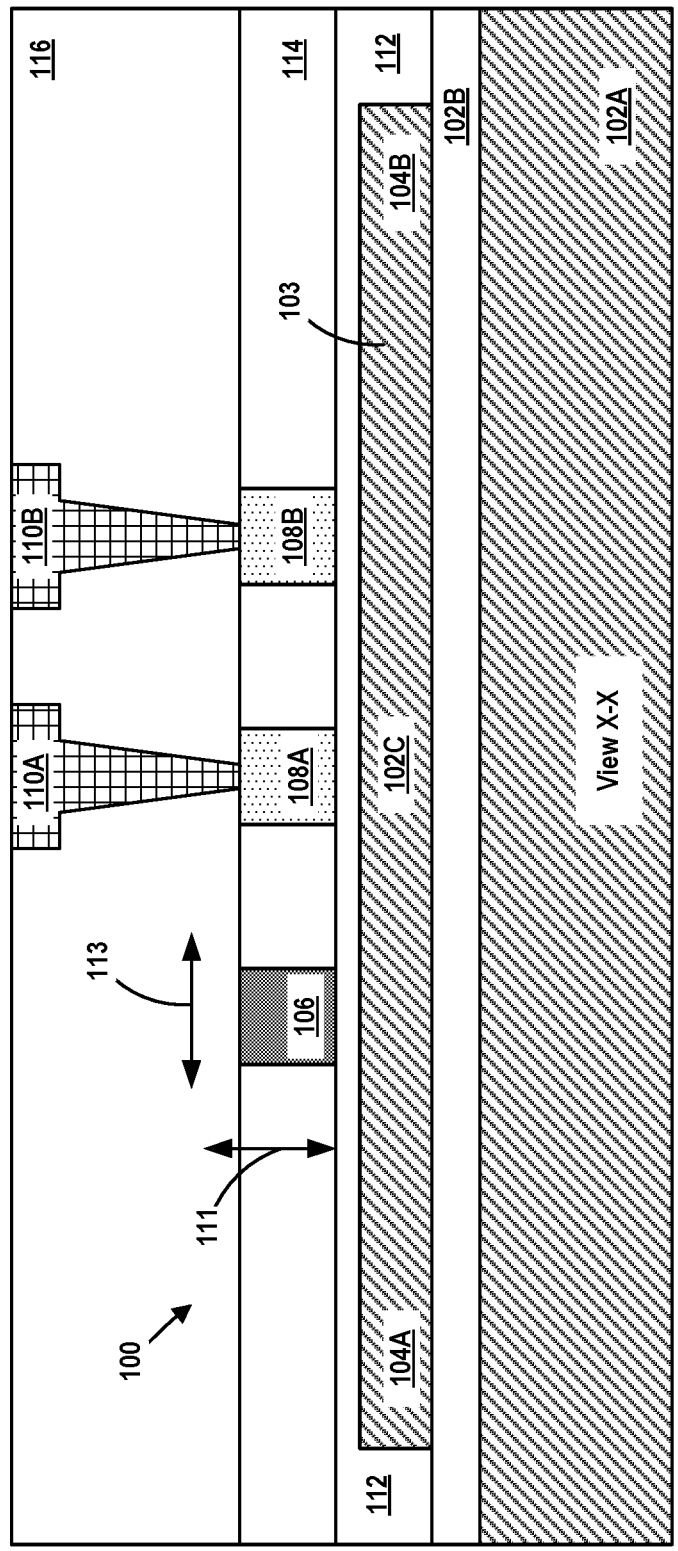

FIGS. 1 and 2 are, respectively, a plan view and a cross-sectional view of one illustrative embodiment of an optical antenna coupler 100 disclosed herein. The cross-sectional view (X-X) is taken where indicated in FIG. 1. The upper layer of insulating material 116 shown in FIG. 2 is not depicted in FIG. 1 so as to facilitate explanation of the subject matter disclosed herein.

The illustrative embodiment of the optical antenna coupler 100 shown in FIGS. 1 and 2 generally comprises a base body 103 and a plurality of antenna coupler elements 105. In this particular example, the base body 103 is formed in the active layer 102C of the substrate 102. The base body 103 comprises first and second waveguides 104A, 104B (collectively referenced using the numeral 104). In this particular example, the plurality of antenna coupler elements 105 comprises an antenna coupler element 106 and variable optical characteristics (VOC) antenna coupler elements 108A and 108B (collectively referenced using the numeral 108) that are comprised of a VOC material (defined below). Also depicted in FIG. 1 are the locations 109A, 109B where conductive contacts will be made to the VOC antenna coupler elements 108A and 108B, respectively, by the simplistically depicted contact structures 110A, 110B, respectively, shown in FIG. 2. With reference to FIG. 2, this illustrative embodiment of the optical antenna coupler 100 also comprises various layers of insulating material 112, 114 and 116. The layers of insulating material 112, 114 and 116 may be comprised of any desired material and they may be formed to any desired thickness. In one illustrative example, the layers of insulating material 112, 114 and 116 may be comprised of a material having a refractive index of about 1.3-1.7, e.g., $SiO_2$ (n=1.45 @ 1.31 μm; n=1.45 @ 1.55 μm; $CaF_2$ (n=1.4272 @ 1.31 μm; 1.4260 @ 1.55 μm), SiCOH (n=1.406 @ 1.31 μm; n=1.407 @ 1.55 μm, $MgF_2$ (n=1.3718 @ 1.31 μm; 1.3705 @ 1.55 μm); $Al_2O_3$, a polymer, etc. The layers of insulating material 112, 114 and 116 need not all be made of the same insulating material, but that may be the case in some applications. Additionally, in some cases, there may be one or more layers of material (not shown), e.g., an etch-stop layer positioned between some or all of the layers of insulating material 112, 114 and 116.

In one illustrative embodiment, the optical antenna coupler 100 disclosed herein comprises at least one antenna coupler element 106 and at least one VOC antenna coupler element 108. In one illustrative embodiment, the at least one antenna coupler element 106 is comprised of a non-phase-change material.

As used herein and in the appended claims, the term "VOC material" shall be understood to mean a material whose optical properties, such as, for example, the refractive index, optical loss and/or permittivity, exhibit significant change or significant variance when the material undergoes a solid-state phase transition or a change in carrier density. More specifically, such VOC materials may transition from a metallic state to an insulator state, or vice versa. When such VOC materials are in the metallic state, the VOC material exhibits characteristics and properties more associated with a metallic material and the VOC material typically has a relatively higher absorption coefficient (a) in this metallic state as compared to the absorption coefficient when the VOC material is in the insulator state. When such VOC materials are in the insulator state, the VOC material exhibits characteristics and properties more associated with an insulating material and the VOC material typically has a relatively lower absorption coefficient (a) in this insulator state as compared to the absorption coefficient when the VOC material is in the metallic state. Such VOC materials may transition from the metallic state to the insulator state, and vice-versa. The transition from state-to-state may be achieved by applying energy to the VOC material. As described more fully below, such VOC materials may also be maintained in the metallic state or the insulator state by applying energy to the VOC material. Such energy may take a variety of forms, e.g., thermal energy (i.e., heating and cooling), electrical energy in the form of applied electrical fields or currents, optical energy, etc. As used herein and in the appended claims, the term "VOC antenna coupler element") shall be understood to mean an antenna coupler element that comprises a VOC material.

As noted above, in one illustrative embodiment, the at least one antenna coupler element 106 is comprised of a non-phase-change material, while the at least one VOC antenna coupler element 108 is comprised of a VOC material. In other embodiments, all of the plurality of antenna coupler elements 105 may be comprised of a VOC material, wherein some of the plurality of antenna coupler elements 105 are passive in nature, as will be described more fully below. In the illustrative example wherein the optical antenna coupler 100 comprises a plurality of the VOC antenna coupler elements 108, all of the VOC antenna coupler elements 108 may be comprised of the same VOC material or they may be comprised of different VOC materials.

As will be appreciated by those skilled in the art after a compete reading of the present application, the VOC materials described herein may include a variety of different materials. In one illustrative example, the VOC materials may comprise a phase-change material or a transparent conducting oxide (TCO) material. Illustrative examples of such phase-change materials include, but are not limited to, any of the chalcogenide alloys, Ge—Sb—Te (GST) based materials such as $GS2Sb_2Te_5$, Ge—Sb—Se—Te (GSST) based materials such as $GS2Sb_2Se_4TS1$, $VO_2$, 2D materials such as graphene, $MoS_2$, etc. Illustrative TCO materials include, but are not limited to, ITO, indium zinc oxide (IZO), etc.

The at least one antenna coupler element 106 may be comprised of a variety of different non-phase-change materials. For example, such non-phase-change materials may include, but are not limited to, silicon, polysilicon, amorphous silicon, silicon nitride, a metal-containing material or a substantially pure metal such as copper, tungsten, aluminum, gold, silver, etc., or a dielectric material having a relatively high refractive index (n) (a high-index dielectric material), i.e., a refractive index that falls within the range of about 1.8-5 at a wavelength of 1.31 μm.

The cross-sectional configuration and physical dimensions of the antenna coupler element(s) 106 and the VOC antenna coupler element(s) 108 may vary depending upon the particular application, and the antenna coupler element(s) 106 and the VOC antenna coupler element(s) 108 need not all have the same configuration and physical dimensions, but that may be the case in some applications. In the illustrative examples depicted herein, the antenna coupler element(s) 106 and the VOC antenna coupler element(s) 108 have a substantially rectangular cross-sectional configuration but they may have other cross-sectional configurations as well, e.g., circular, trapezoidal, semi-circular, etc. Moreover, the cross-sectional configuration of each of the antenna coupler element(s) 106 and the VOC antenna coupler element(s) 108 need not be the same, but that may be the case in some applications. With reference to FIG. 2, the vertical thickness (in the direction 111) and lateral width (in the direction 113) of the antenna coupler element(s) 106 and the VOC antenna coupler element(s) 108 may vary depending upon the particular application. Moreover, the vertical thickness and the lateral width of each of the antenna coupler element(s) 106 and the VOC antenna coupler element(s) 108 need not be the same, but that may be the case in some applications. Additionally, with reference to FIG. 1, the axial length (in the direction 115) of the antenna coupler element(s) 106 and the VOC antenna coupler element(s) 108 may vary depending upon the particular application. For example, in the embodiment shown in FIG. 1, the antenna coupler element 106 has a shorter axial length than the axial length of the VOC antenna coupler elements 108. More specifically, the antenna coupler element 106 does not extend to the contact areas 109 of the VOC antenna coupler elements 108 as incident light may not be directed to the location where the contact structures 110A, 110B will be formed so that the incident light is not absorbed by the contact structures 110A, 110B. In the depicted example, the VOC antenna coupler structures 108A and 108B have the same axial length, but that may not be the case in all applications as the cross-sectional configuration and the physical dimensions of the VOC antenna coupler structures 108A and 108B need not be the same in all cases.

Figure 3:
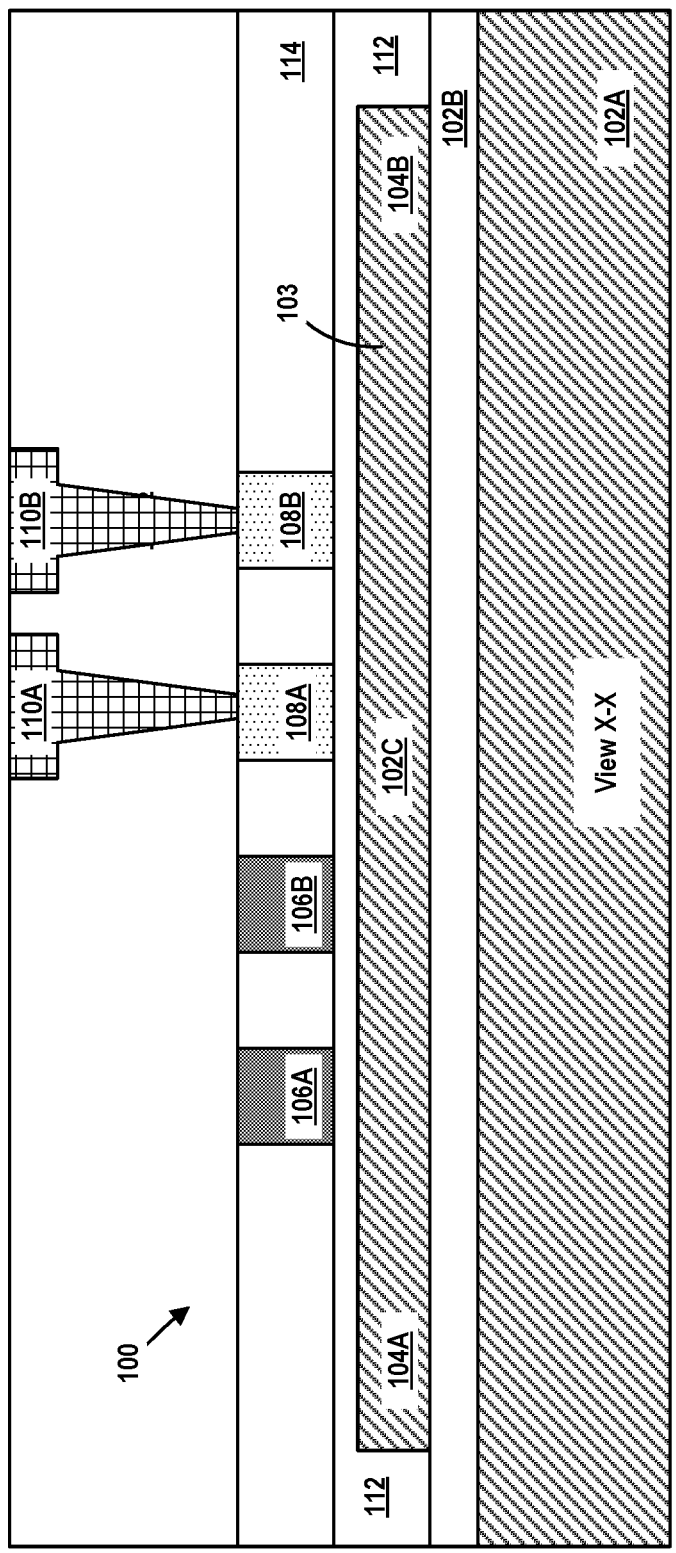
Figure 4:
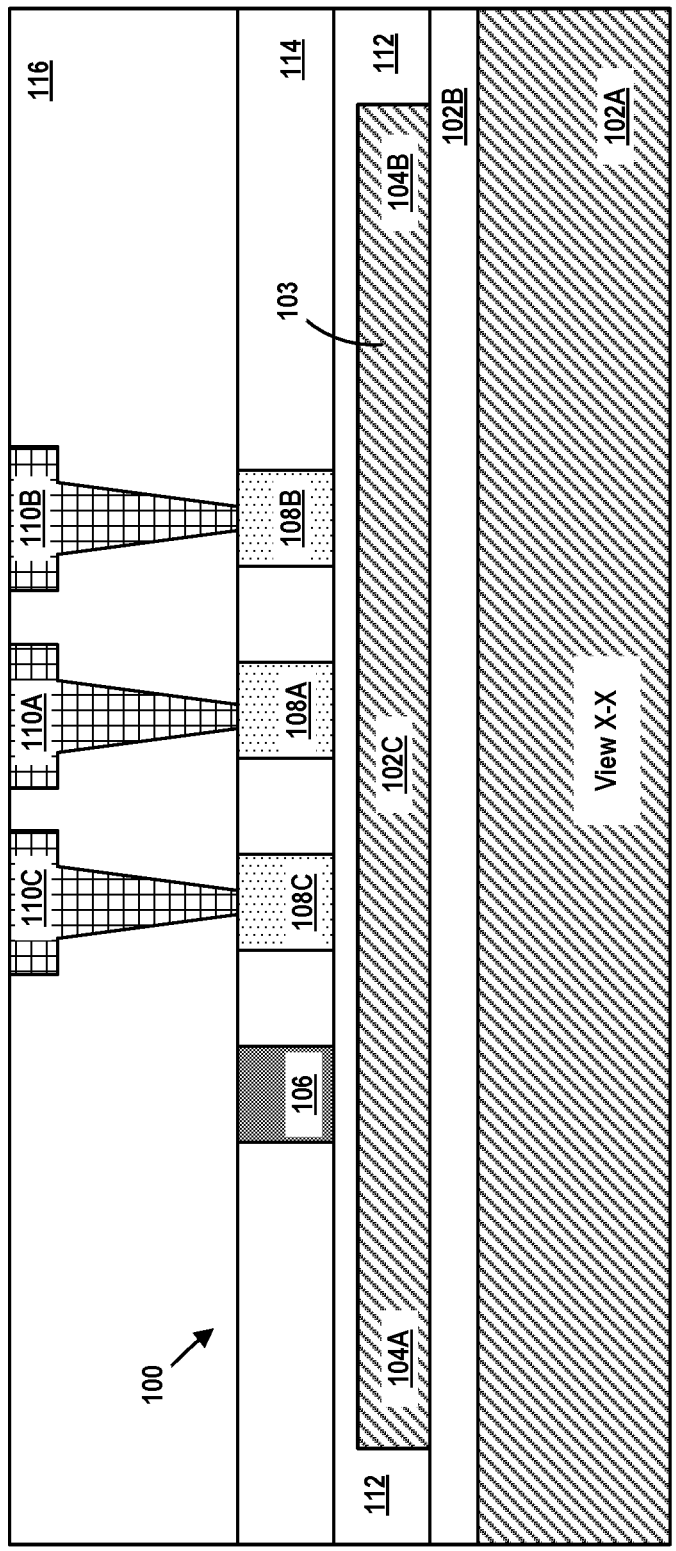
Figure 5:
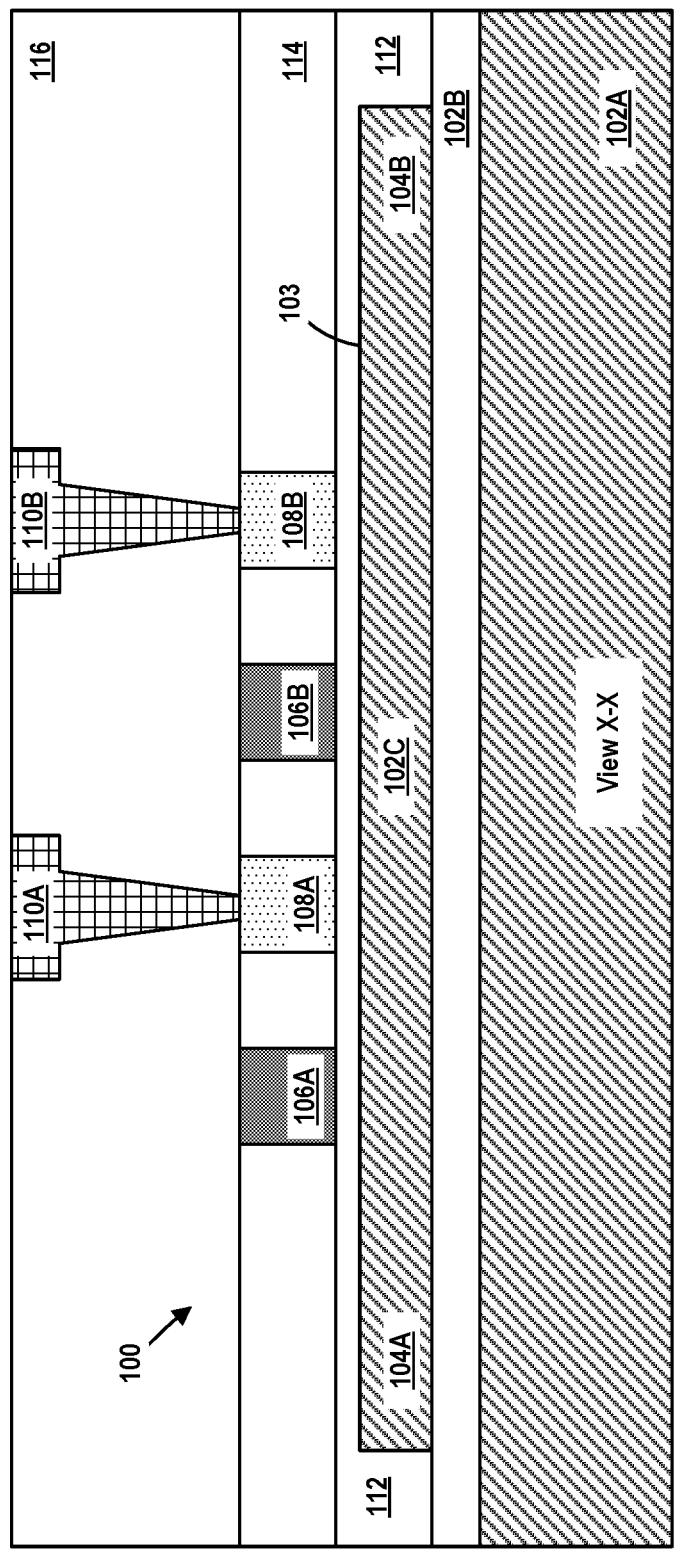
Figure 6:
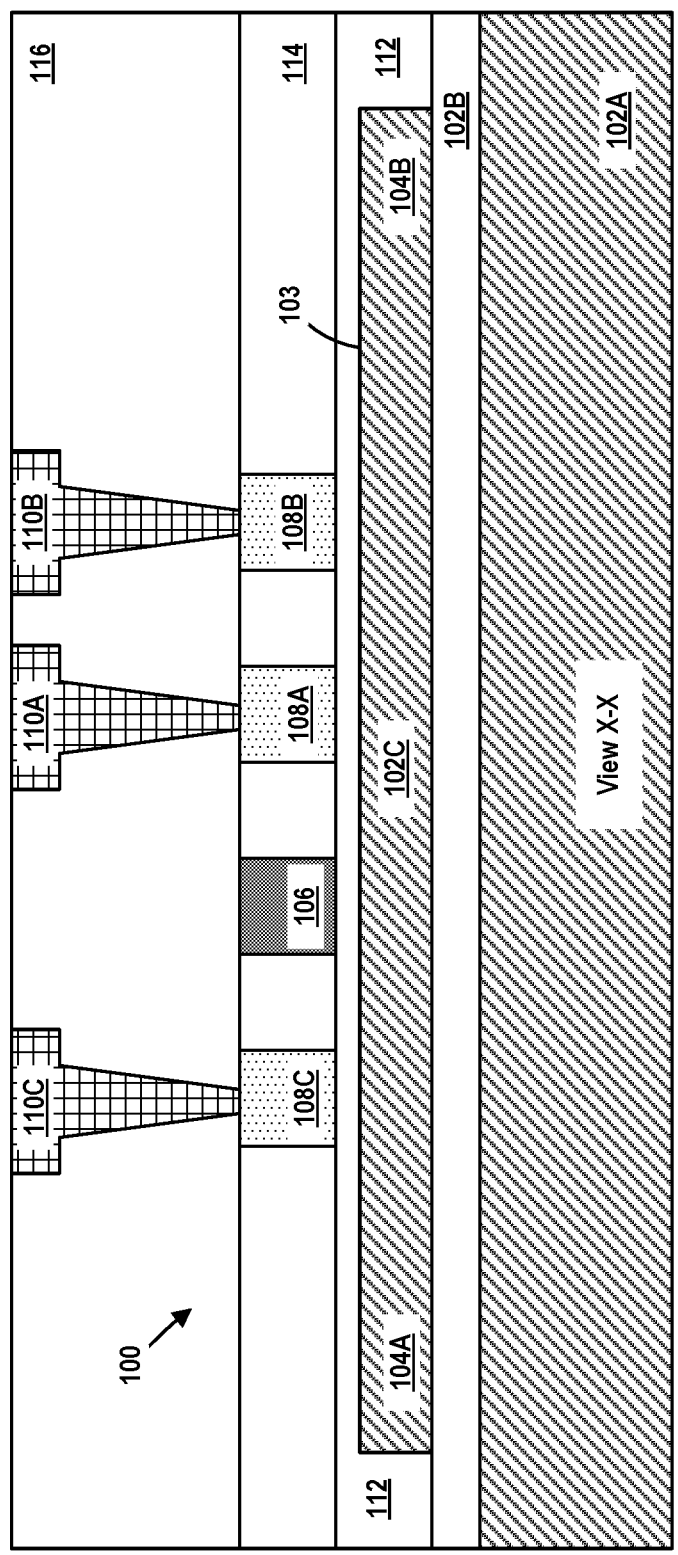
Figure 7:
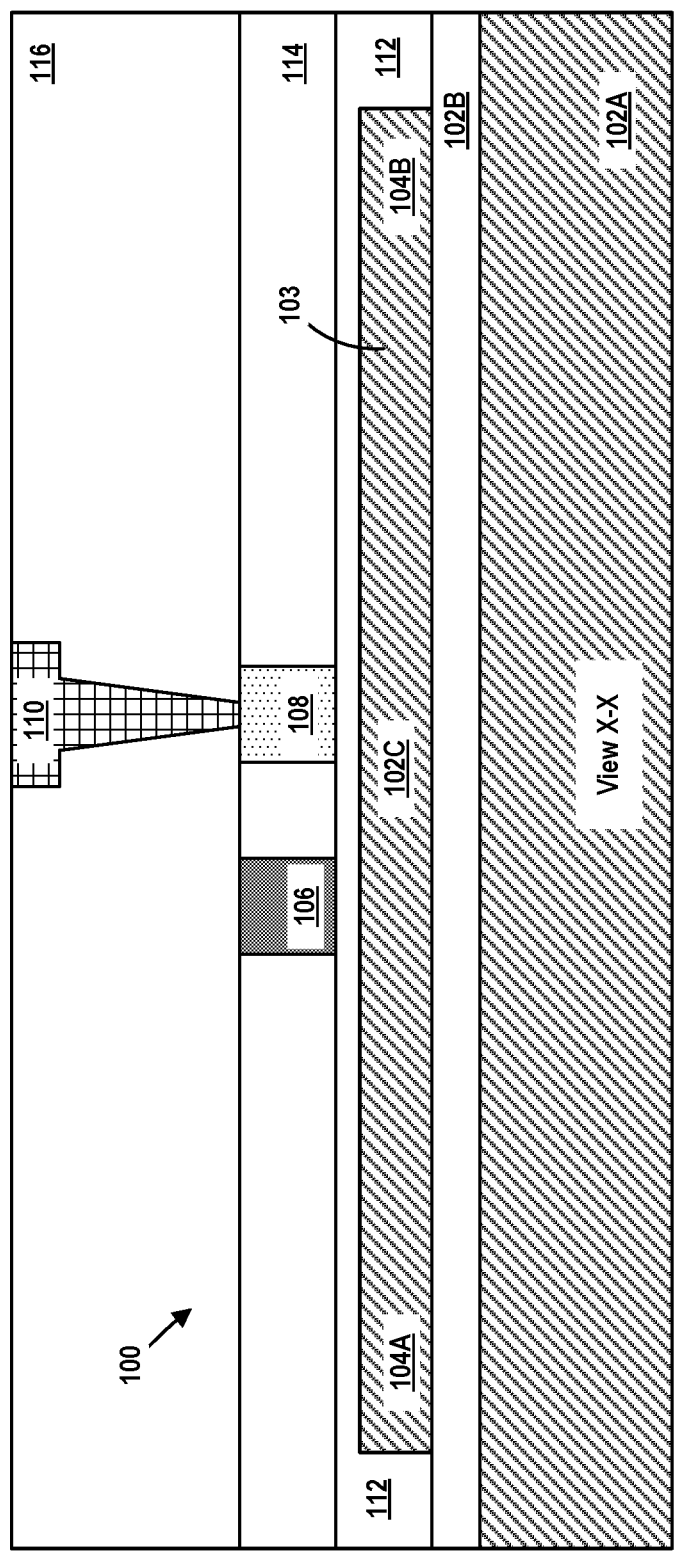

As will be appreciated by those skilled in the art after a complete reading of the present application, the number of the antenna coupler elements 106 and the number of the VOC antenna coupler elements 108 on the optical antenna coupler 100 may vary depending upon the particular application. The embodiment of the optical antenna coupler 100 shown in FIGS. 1 and 2 comprises one antenna coupler element 106 and two of the VOC antenna coupler elements 108. FIG. 3 is a cross-sectional view of another embodiment of an optical antenna coupler 100 that comprises two of the antenna coupler elements 106A, 106B (collectively referenced using the numeral 106) and two of the VOC antenna coupler elements 108. FIG. 4 is a cross-sectional view of another embodiment of an optical antenna coupler 100 that comprises one antenna coupler element 106 and three of the VOC antenna coupler elements 108. The antenna coupler elements 108 need not be positioned side-by-side. For example, FIG. 5 is a cross-sectional view of another embodiment of an optical antenna coupler 100 that comprises two of the antenna coupler elements 106 and two of the VOC antenna coupler elements 108. As another example, FIG. 6 is a cross-sectional view of another embodiment of an optical antenna coupler 100 that comprises one antenna coupler element 106 and three of the VOC antenna coupler elements 108, wherein the antenna coupler element 106 is positioned between the VOC antenna coupler elements 108A and 108C. Lastly, FIG. 7 is a cross-sectional view of another embodiment of an optical antenna coupler 100 that comprises one antenna coupler element 106 and one VOC antenna coupler element 108.

Figure 8:
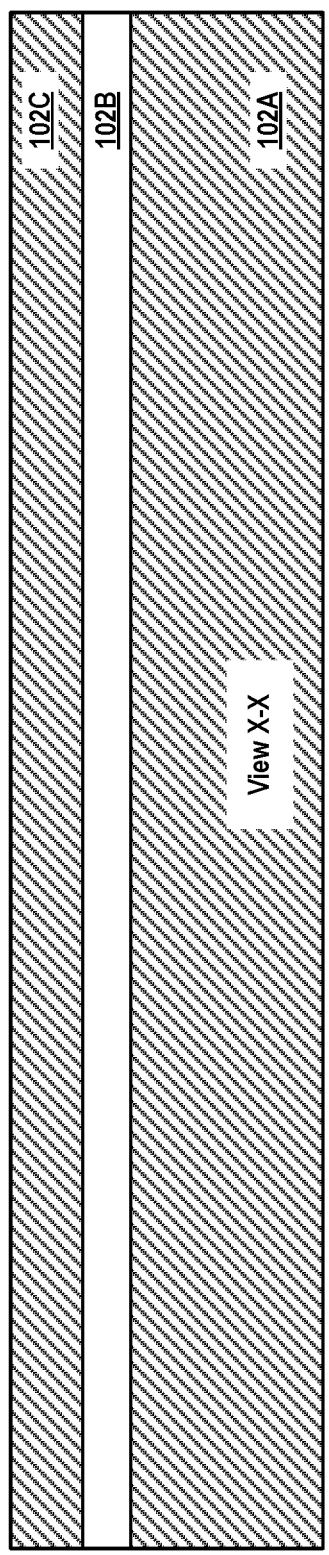

FIGS. 8-15 depict one illustrative process flow for forming the illustrative embodiment of the optical antenna coupler 100 shown in FIGS. 1 and 2. FIG. 8 depicts the starting SOI substrate 102. The thickness of the active layer 102C may vary depending upon the application and, in some cases, the substrate 102 may be obtained from a substrate supplier with the active layer 102C having the desired thickness. In other cases, if desired, the thickness of the active layer 102C may be increased locally or globally by forming additional semiconductor material on the active layer 102C.

Figure 9:
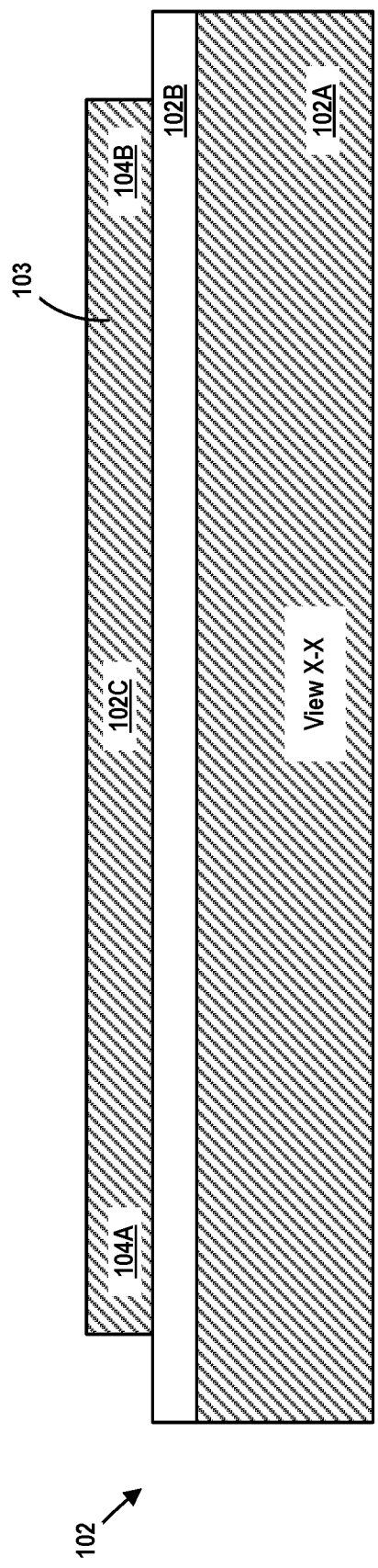
Figure 10:
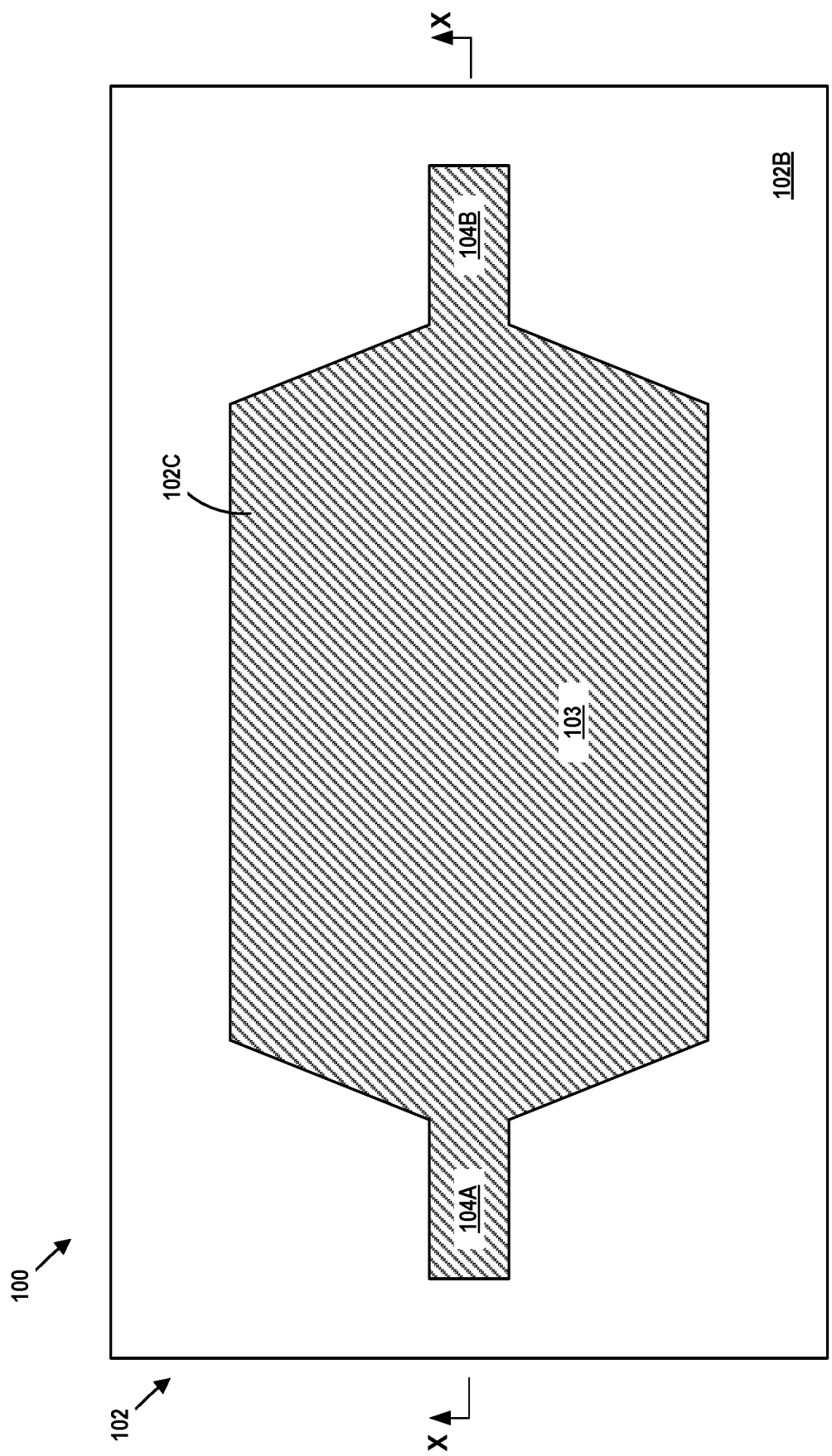

FIGS. 9 (cross-sectional view) and 10 (plan view) depict the optical antenna coupler 100 after several process operations were performed. First, a patterned etch mask (not shown) was formed above the active layer 102C. In one illustrative example, the patterned etch mask may be a patterned layer of photoresist or OPL. In other applications, the patterned etch mask may be a patterned hard mask that is comprised of, for example, silicon nitride. Such a patterned hard mask may be formed by performing known deposition, masking and etching techniques. Next, one or more etching processes were performed through the patterned etch mask to remove exposed portions of the active layer 102C. This results in the formation of the base body 103 of the optical antenna coupler 100. Thereafter, the patterned etch mask was removed.

Figure 11:
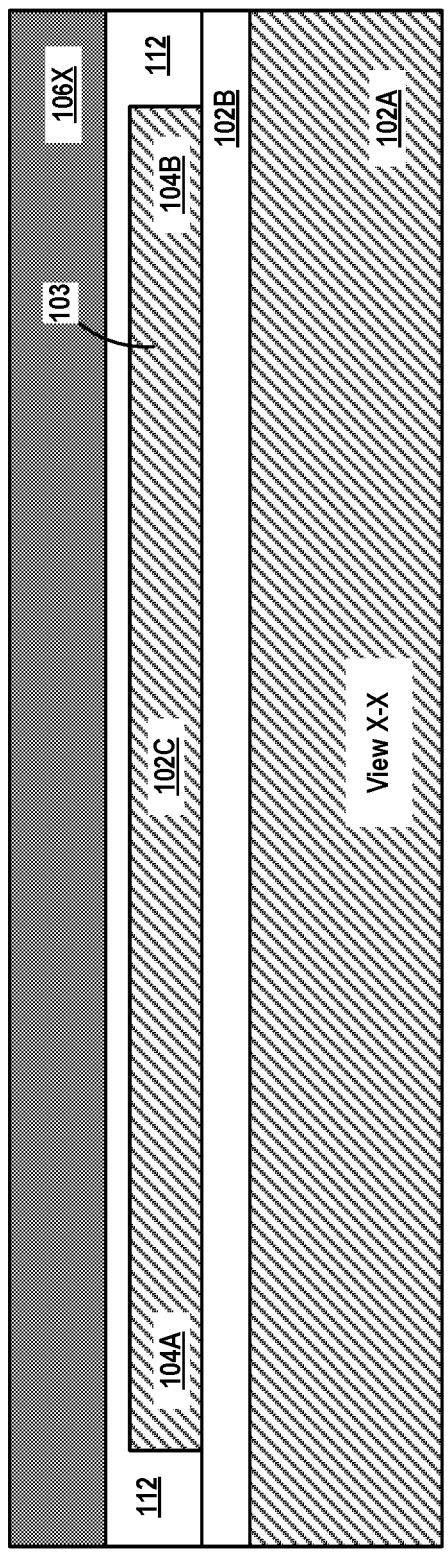
Figure 12:
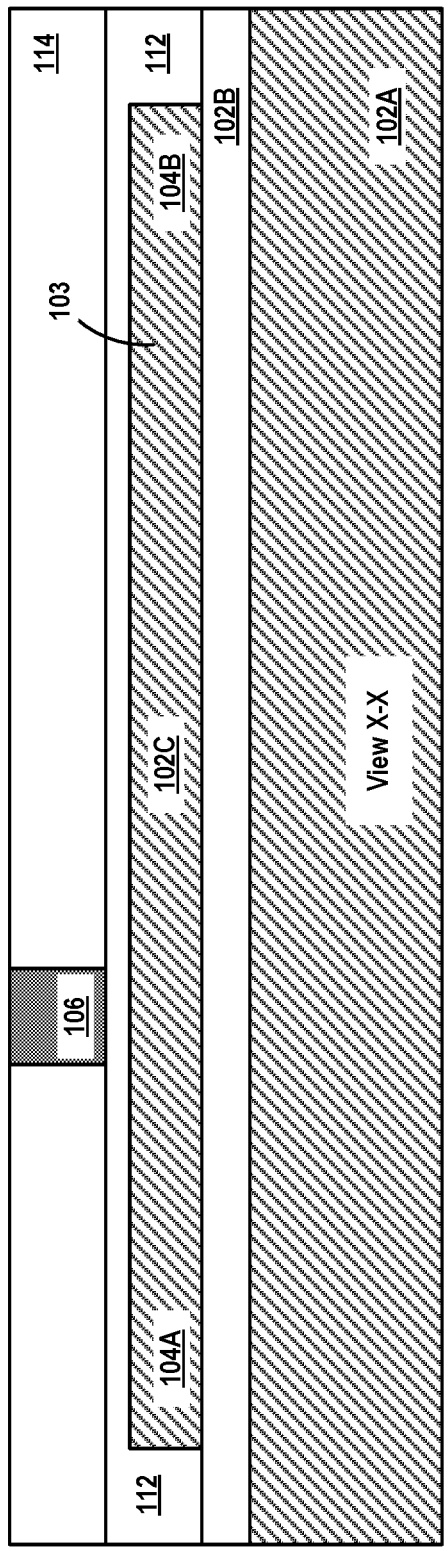

FIG. 11 depicts the optical antenna coupler 100 after several process operations were performed. First, the layer of insulating material 112 was blanket-deposited above the substrate 102. Thereafter, one or more planarization processes (e.g., a CMP or etch-back process) was performed to planarize the upper surface of the layer of insulating material 112. In the depicted example, the layer of insulating material 112 covers the base body 103. The thickness of the layer of insulating material 112 above the upper surface of the base body 103 may vary depending upon the particular application, e.g., about 0.005-0.17 times the operating wavelength (λ) of the optical antenna coupler 100. Next a layer of material 106X for the antenna coupler element 106 was formed above the layer of insulating material 112. Thereafter, the upper surface of the layer of material 106X was planarized FIG. 12 depicts the optical antenna coupler 100 after several process operations were performed. First, another patterned etch mask (not shown) was formed above the layer of material 106X. Next, one or more etching processes were performed through the patterned etch mask to remove exposed portions of the layer of material 106X. This results in the formation of the antenna coupler element 106 of the optical antenna coupler 100. Thereafter, the patterned etch mask was removed. Next, the layer of insulating material 114 was formed on the substrate 102. Thereafter, the upper surface of the layer of insulating material 114 was planarized. This process operation exposes the upper surface of the antenna coupler element 106.

Figure 13:
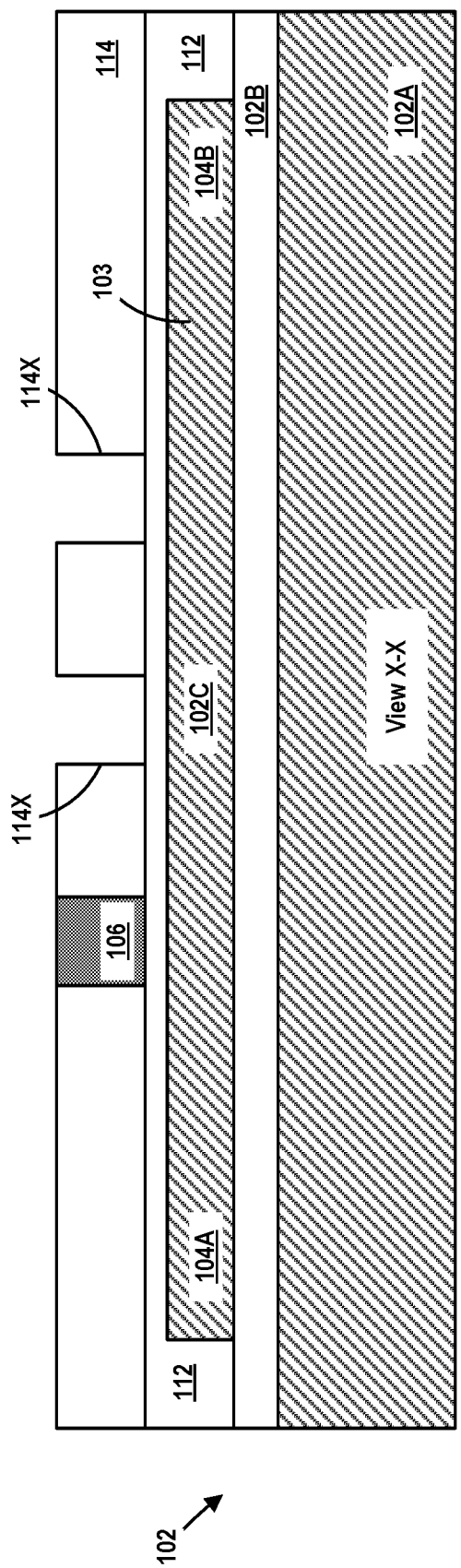

FIG. 13 depicts the optical antenna coupler 100 after several process operations were performed. First, another patterned etch mask (not shown) was formed above the layer of insulating material 114. Next, one or more etching processes were performed through the patterned etch mask to remove exposed portions of the layer of insulating material 114. This results in the formation of a plurality of openings 114X in the layer of insulating material 114. Thereafter, the patterned etch mask was removed.

Figure 14:
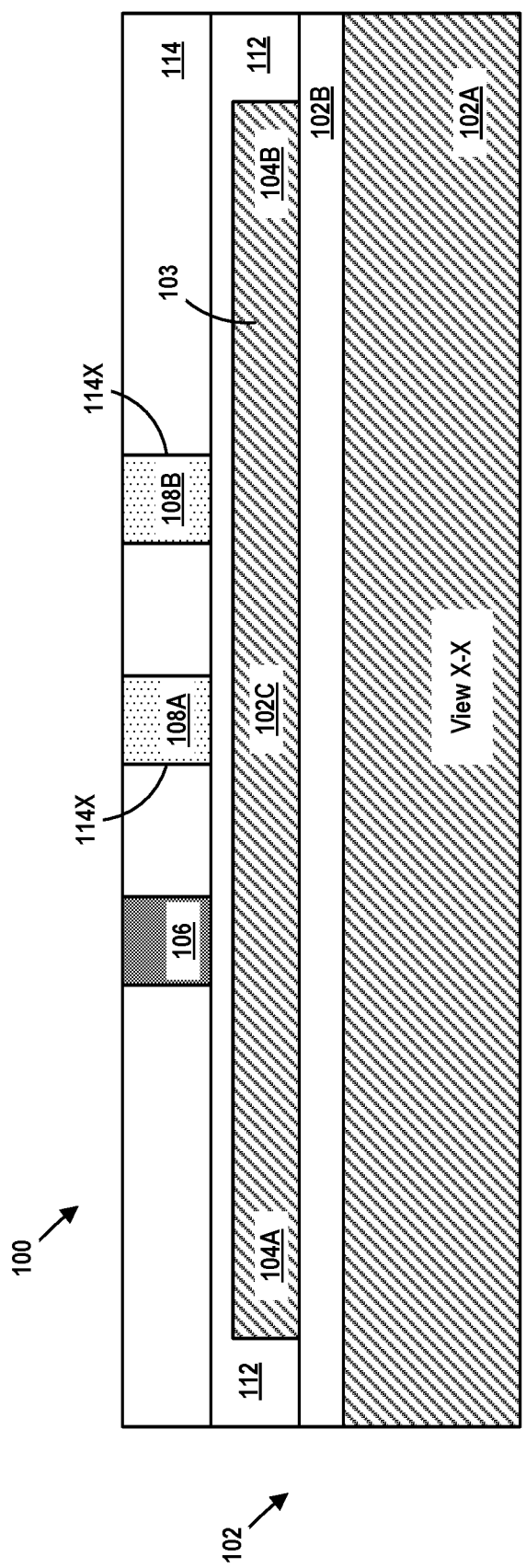

FIG. 14 depicts the optical antenna coupler 100 after several process operations were performed. First, a layer of material (not shown) for the VOC antenna coupler elements 108 was formed above the layer of insulating material 114 so as to over-fill the openings 114X in the layer of insulating material 114. Thereafter, a CMP or etch-back process was performed to remove the portions of the layer of material positioned outside of the openings 114X and above the upper surface of the layer of insulating material 114. These process operations result in the formation of the VOC antenna coupler elements 108A and 108B.

Figure 15:
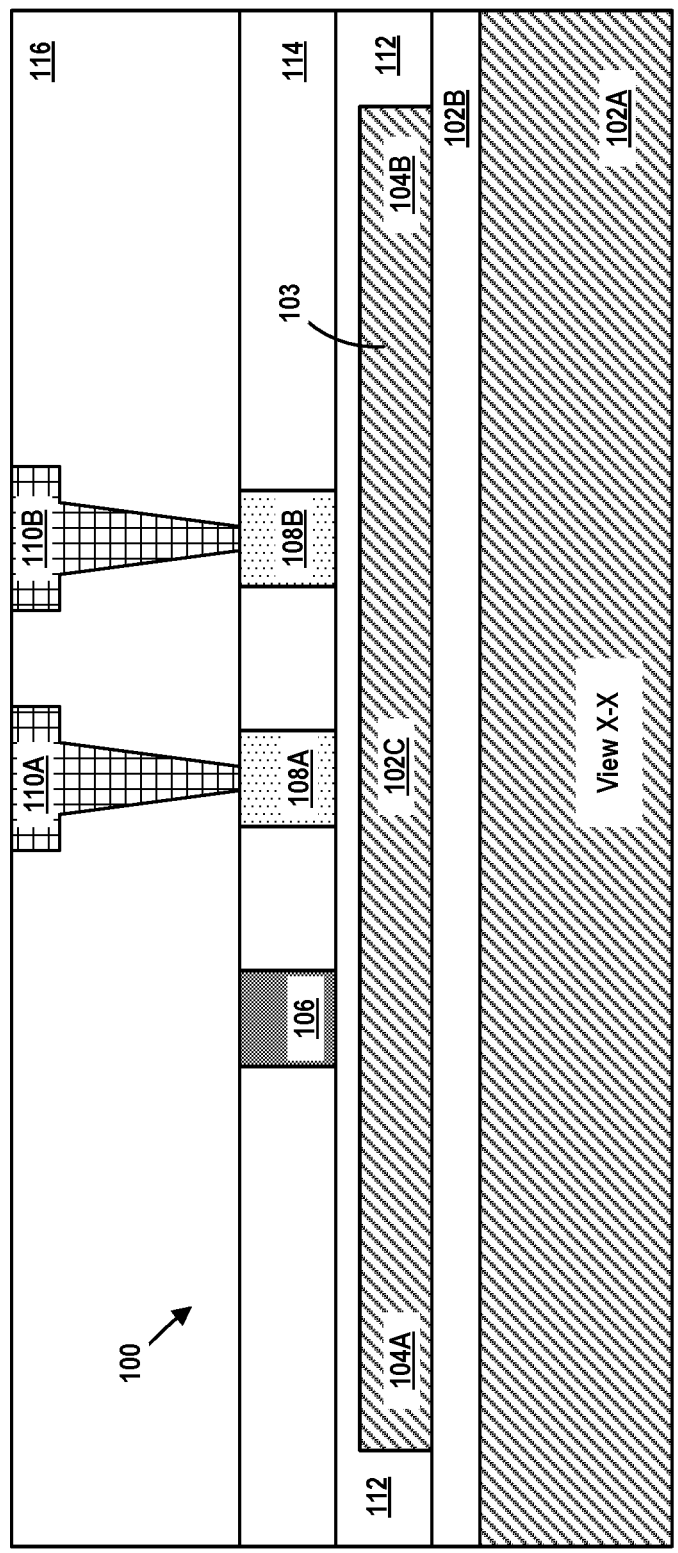

FIG. 15 depicts the optical antenna coupler 100 after several process operations were performed. First, the layer of insulating material 116 was blanket-deposited above the substrate 102. Thereafter, one or more planarization processes (e.g., a CMP or etch-back process) were performed to planarize the upper surface of the layer of insulating material 116. Next, the illustrative and simplistically depicted conductive contact structures 110 were formed in the layer of insulating material. As depicted, the conductive contact structures 110A, 110B conductively contact the VOC antenna coupler elements 108A, 108B, respectively. The conductive contact structures 110 may be comprised of any conductive material, e.g., tungsten, copper, etc., and they may be formed using techniques that are well known to those skilled in the art.

In the embodiments depicted above, the base body 103 of the optical antenna coupler 100 was formed from a semiconductor material, e.g., the active layer 102C of the substrate 102. However, as will be appreciated by those skilled in the art after a complete reading of the present application, the base body 103 may be formed from a variety of different materials, e.g., crystallized silicon (n~3.5 @ 1.31 µm; n~3.48 @ 1.55 µm), polysilicon, amorphous silicon, a metal-containing material or a substantially pure metal, e.g., copper, tungsten, aluminum, silver, gold, etc., or a dielectric material with a refractive index that falls within the range of about 1.8-5 at a wavelength of 1.31 µm, such as $Si_3N_4$ (n=~2 @ 1.31 µm, n=~2 @ 1.55 µm), SiON, AlN; $TiO_2$ (titanium dioxide) (n=2.4622 @ 1.31 µm; n=2.4538 @1.55 µm); ZnO (zinc monoxide) (n=1.9318 @ 1.31 µm; n=1.9267 @ 1.55 µm), etc.

Figure 16:
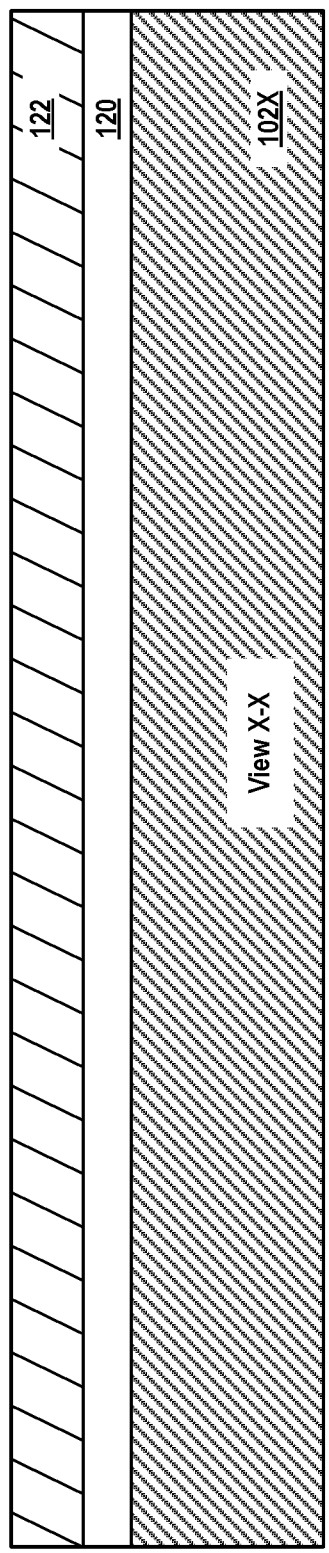

FIGS. 16-19 depict one illustrative process flow wherein the embodiment of the optical antenna coupler 100 shown in FIGS. 1 and 2 may be formed with the base body 103 comprised of a different material. FIG. 16 depicts a bulk semiconductor substrate 102X with a layer of insulating material 120, e.g., silicon dioxide, formed on the upper surface of the substrate 102X. Also depicted is a layer of base body material 122, e.g., silicon nitride, a metal or a metal-containing material, that was formed on the layer of insulating material 120. The layer of base body material 122 may be formed to any desired thickness.

Figure 17:
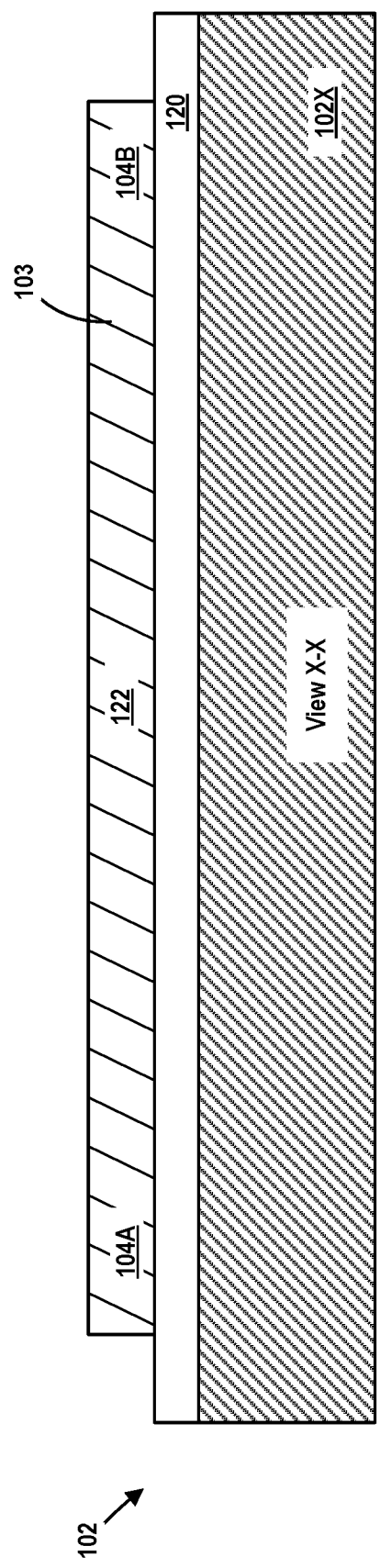
Figure 18:
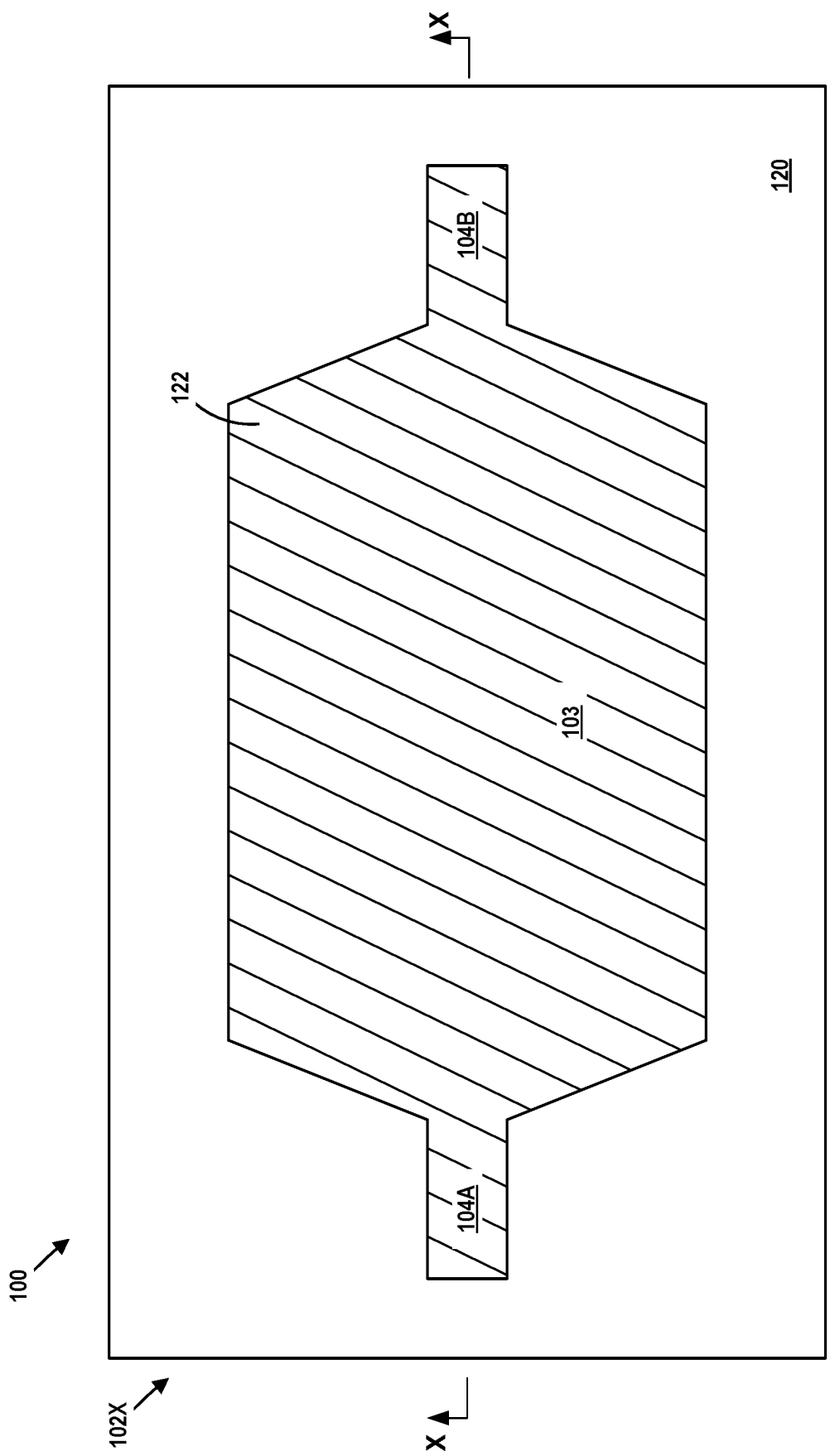

FIGS. 17 (cross-sectional view) and 18 (plan view) depict the optical antenna coupler 100 after several process operations were performed. First, a patterned etch mask (not shown) was formed above the layer of base body material 122. Next, one or more etching processes were performed through the patterned etch mask to remove exposed portions of the layer of base body material 122. This results in the formation of the base body 103 of the optical antenna coupler 100. Thereafter, the patterned etch mask was removed.

Figure 19:
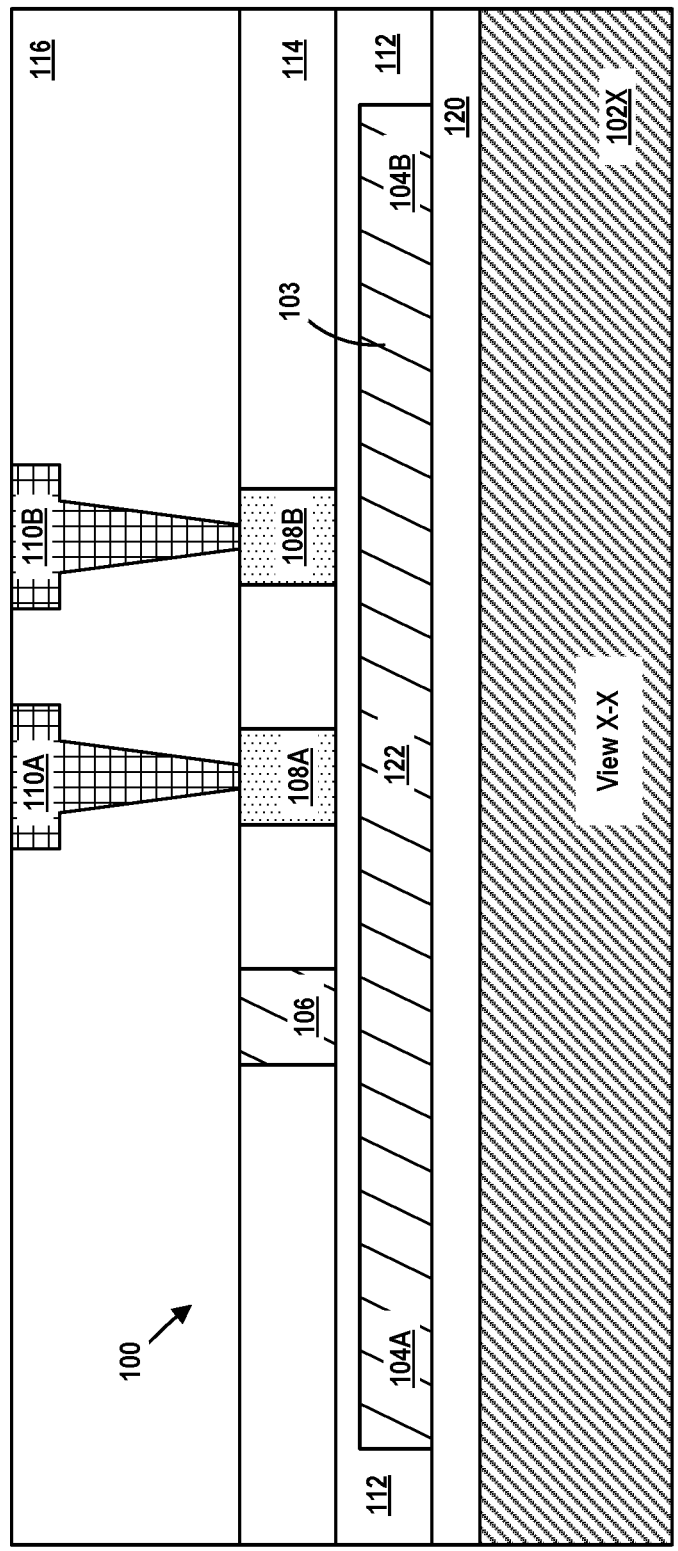

FIG. 19 depicts the optical antenna coupler 100 after the operations described above in connection with FIGS. 11-15 were performed to complete the fabrication of the optical antenna coupler 100. However, in this illustrative embodiment, the antenna coupler element 106 was also made of the same material as the base body 103, e.g., silicon nitride, a metal or a metal-containing material.

Certain operational aspects of the optical antenna coupler 100 will now be discussed in connection with FIGS. 20-23. As noted above, the VOC antenna coupler elements 108 are comprised of a VOC material whose optical properties, such as, for example, the refractive index, optical loss and/or permittivity, exhibit significant change when the material undergoes a solid-state phase transition when an appropriate energy (E) is applied to the antenna coupler elements 108. For a phase-change material and a TCO material, application of an appropriate energy to the material enables one of the states (i.e., the metallic state or the insulator state). Removal of the applied energy causes the phase-change material and TCO material to transition to the other state. However, the way energy is applied to a phase-change material and a TCO material may be different.

More specifically, in the case where the VOC material is a phase-change material such as VO2, maintaining the phase-change material in the metallic state or transitioning the phase-change material from the insulator state to the metallic state requires application of an appropriate energy (E), e.g., an electrical voltage, an electrical current, heat, optical energy from a light source, etc. to the material. On the other hand, to transition the phase-change material from the metallic state to the insulator state (or to maintain the phase-change material in the insulator state), all that is required is the removal of the applied energy (E).

However, in the case where the VOC material is a TCO material, the process is just the opposite. More specifically, for a TCO material such as ITO and IZO, maintaining the TCO material in the insulator state or transitioning the TCO material from the metallic state to the insulator state requires application of an appropriate energy (E), e.g., an electrical voltage, an electrical current, heat, optical energy from a light source, etc., to the material. On the other hand, to transition the TCO material from the insulator state to the metallic state (or to maintain the TCO material in the metallic state), all that is required is the removal of the applied energy (E).

Figure 20:
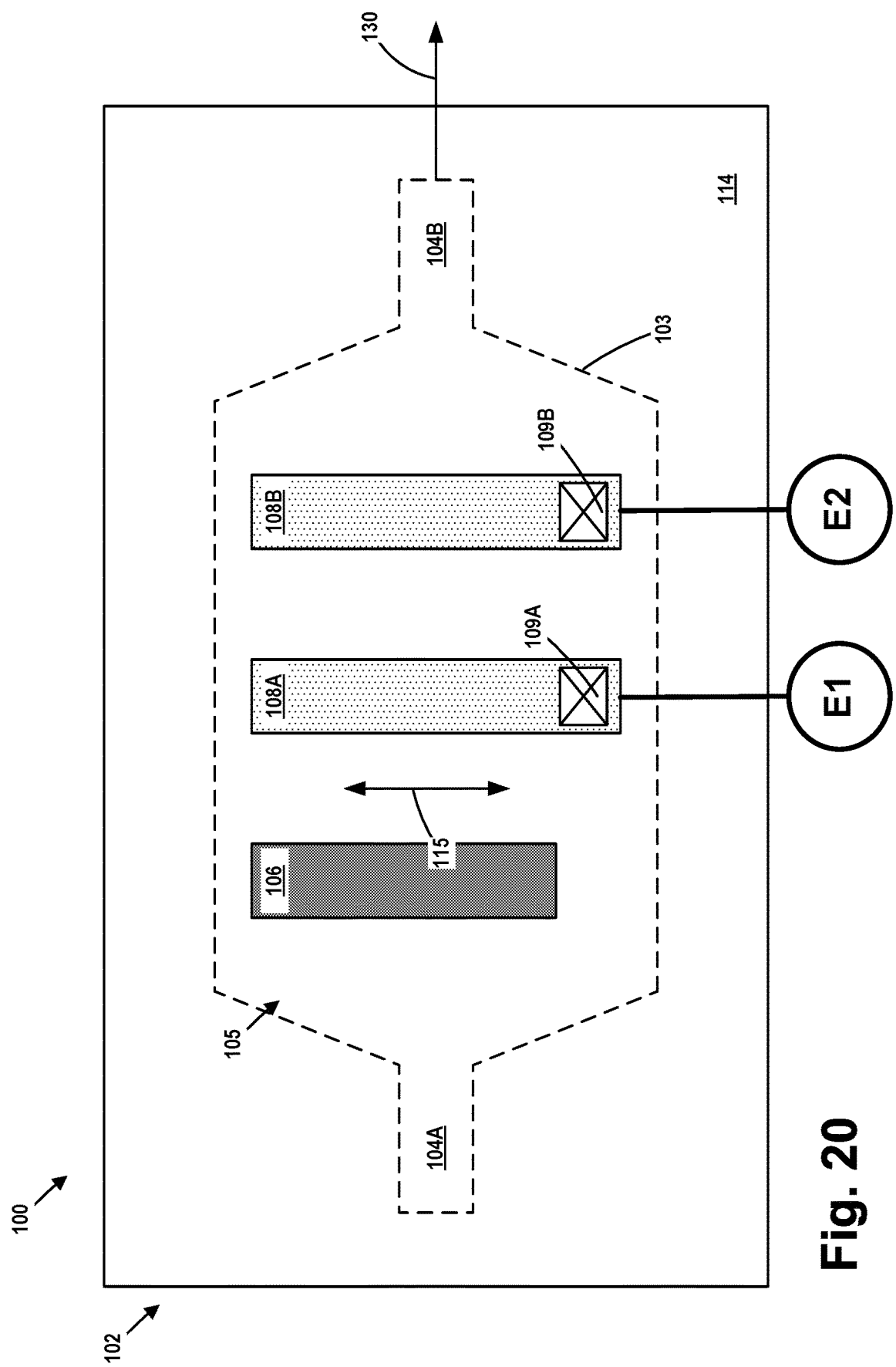
Figure 21:
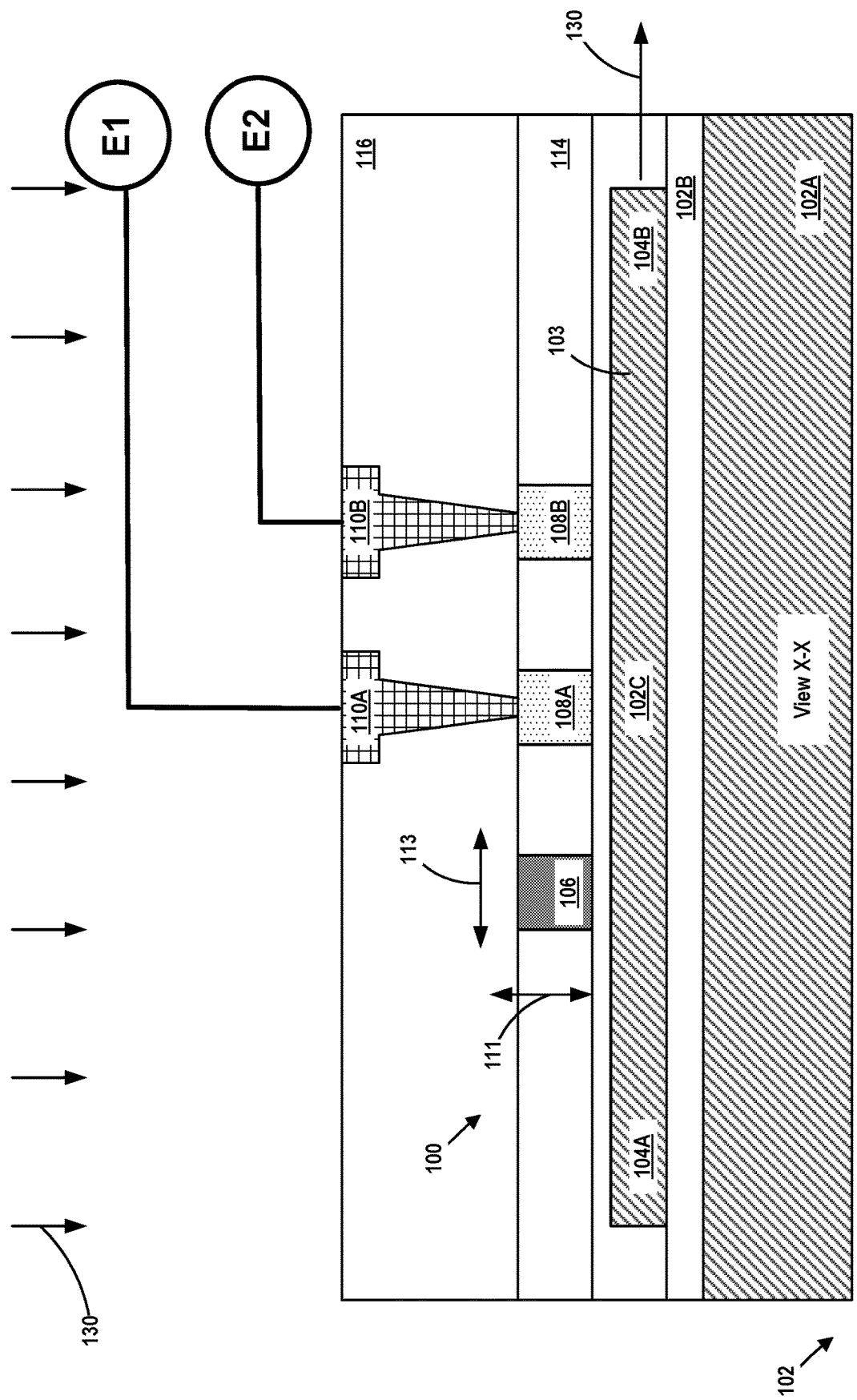

As depicted in FIGS. 20 and 21, separate sources E1, E2 of the appropriate energy are operatively coupled to the VOC antenna coupler elements 108A, 108B such that an appropriate energy may be applied to the VOC antenna coupler elements 108A, 108B individually so as to achieve a desired phase-change to one or both of the VOC antenna coupler elements 108A, 108B.

In the case where the VOC antenna coupler elements 108A, 108B are comprised of a phase-change material, the VOC antenna coupler elements 108A, 108B may be maintained in the metallic state or transitioned from the insulator state to the metallic state by application of an appropriate electrical energy, e.g., an appropriate voltage or current. In one illustrative embodiment, based upon current-day technology, the voltage needed to maintain the phase-change material in the metallic state or transition the phase-change material from the insulator state to the metallic state may be about 1-7 volts. The voltages or currents (E1, E2) may be applied to the antenna coupler elements 110A, 110B, respectively, through various conductive members (not shown) formed in one or more metallization layers formed above the substrate 102. The techniques used to form such conductive members and their configurations are well known to those skilled in the art.

In the case where the VOC antenna coupler elements 108A, 108B are comprised of a TCO material, the VOC antenna coupler elements 108A, 108B may be maintained in the insulator state or transitioned from the metallic state to the insulator state by application of an appropriate electrical energy, e.g., an appropriate voltage or current. In one illustrative embodiment, based upon current-day technology, the voltage needed to maintain the TCO material in the insulator state or transition the TCO material from the metallic state to the insulator state may be about 1-7 volts. As before, the voltages or currents (E1, E2) may be applied to the antenna coupler elements 110A, 110B, respectively, through various conductive members (not shown) formed in one or more metallization layers formed above the substrate 102.

In general, the optical antenna coupler 100 disclosed herein is adapted to be positioned in first and second operational states. In the first operational state (see FIG. 21) substantially all of the incident light 130 is directed out of the optical antenna coupler 100 via the waveguide 104B while substantially no amount of the incident light 130 is directed out of the optical antenna coupler 100 via the waveguide 104A. In the second operational state (see FIG. 23) substantially all of the incident light 130 is directed out of the optical antenna coupler 100 via the waveguide 104A while substantially no amount of the incident light 130 is directed out of the optical antenna coupler 100 via the waveguide 104B.

In the case where the VOC antenna coupler elements 108A, 108B are comprised of a phase-change material, the VOC antenna coupler elements 108A, 108B may be maintained in the metallic state or transitioned from the insulator state to the metallic state by application of an appropriate thermal energy. In one illustrative embodiment, based upon current-day technology, the temperature needed to maintain the phase-change material in the metallic state or transition the phase-change material from the insulator state to the metallic state may be about 90° C. In one illustrative embodiment, based upon current-day technology, the temperature at which the phase-change material transitions from the metallic state to the insulator state may be about 30° C. The thermal energy (E1, E2) may be applied to the VOC antenna coupler elements 108A, 108B, respectively, by applying appropriate voltages to resistive micro-heaters (not shown) that are positioned in close proximity to the VOC antenna coupler elements 108A, 108B. Illustrative examples of the materials to form such resistive micro-heaters include, but are not limited to, Ti, TiN, TaN, NiCr, metal silicides, polysilicon, etc. The techniques used to form such resistive micro-heaters and their configurations are well known to those skilled in the art.

In the case where the VOC antenna coupler elements 108A, 108B are comprised of a TCO material, the VOC antenna coupler elements 108A, 108B may be maintained in the insulator state or transitioned from the metallic state to the insulator state by application of an appropriate thermal energy. In one illustrative embodiment, based upon current-day technology, the temperature needed to maintain the TCO material in the insulator state or transition the TCO material from the metallic state to the insulator state may be about 25-60° C.

In the case where optical energy, i.e., light, is the energy (E) that is used to cause the phase-change material or TCO material to transition from state to state, the VOC antenna coupler elements 108A, 108B may be formed with different axial lengths and incident light may irradiate the VOC antenna coupler elements 108A, 108B at different locations. The incident light may be directed to each of the VOC antenna coupler elements 108A, 108B by a variety of techniques, e.g., using two light sources or splitting the incident light into two separate streams and directing them separately to each of the VOC antenna coupler elements 108A, 108B.

As before, in the case where the VOC antenna coupler elements 108A, 108B are comprised of a phase-change material, the VOC antenna coupler elements 108A, 108B may be maintained in the metallic state or transitioned from the insulator state to the metallic state by application of an appropriate optical energy (E). In one illustrative embodiment, based upon current-day technology, the amount of optical energy needed to maintain the phase-change material in the metallic state or transition the phase-change material from the insulator state to the metallic state may be about (~0.1-100 mJ/cm$^2$)

FIGS. 20 and 21 depict the illustrative example wherein the VOC antenna coupler element 108A is in the metallic state and the VOC antenna coupler element 108B is in the insulator state. With the VOC antenna coupler elements 108 in such states, a substantial portion and perhaps all of the incident light 130 (see FIG. 21) that hits the optical antenna coupler 100 and is scattered by the optical antenna coupler 100 will be directed out of the optical antenna coupler 100 via the waveguide 104B, while little if any of the incident light will be directed out of the waveguide 104A. This occurs because the VOC antenna coupler element 108A is in its metallic state and the lateral distance or spacing between the antenna coupler element 106 and the VOC antenna coupler element 108A is relatively small. Thus, in this case, the interference of the scattered light waves results in generation of a substantially unidirectional light toward the right where it ultimately exits the optical antenna coupler 100 via the waveguide 104B. The incident light 130 may come from any source, e.g., a fiber optic cable, a laser, etc.

Figure 22:
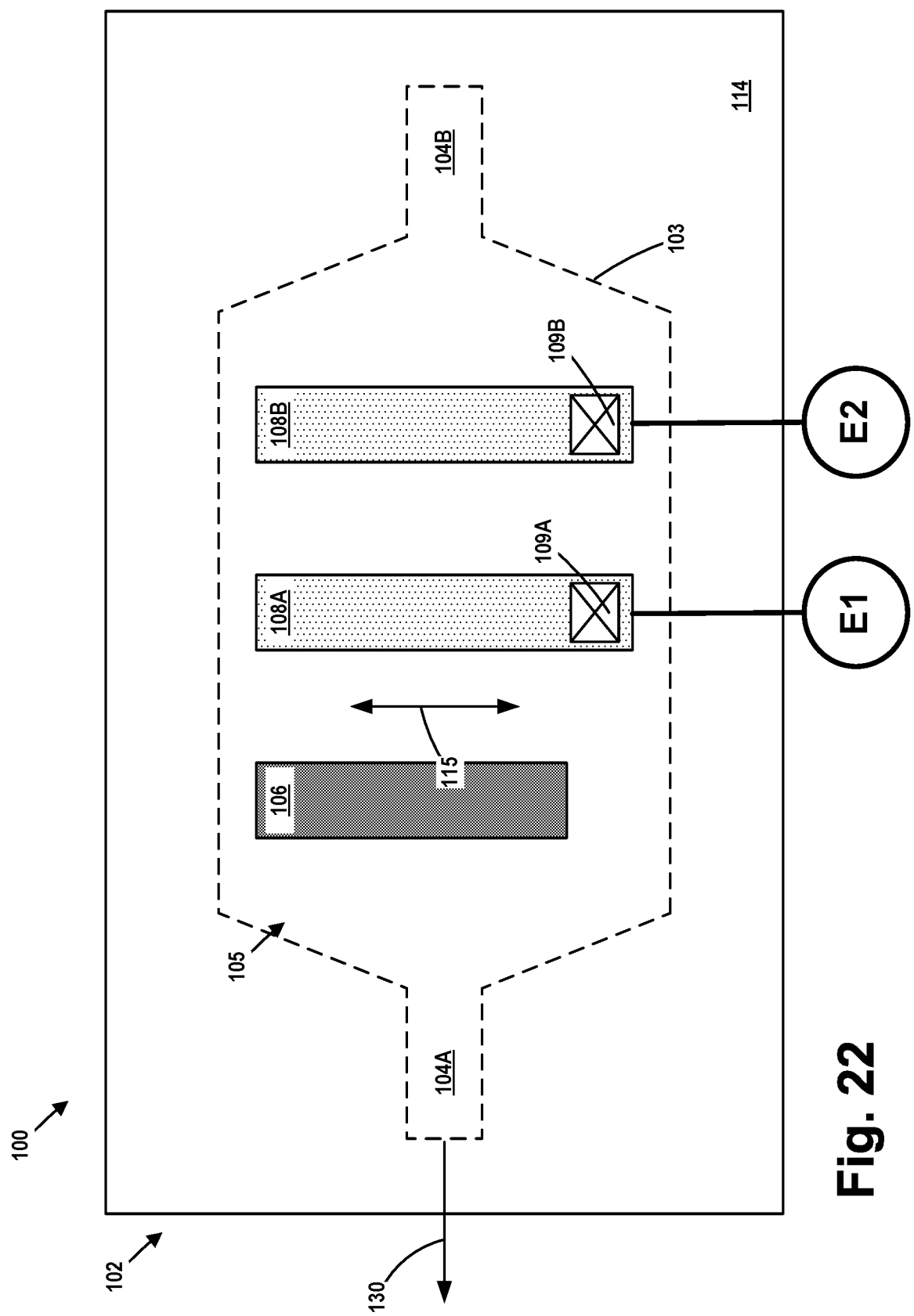
Figure 23:
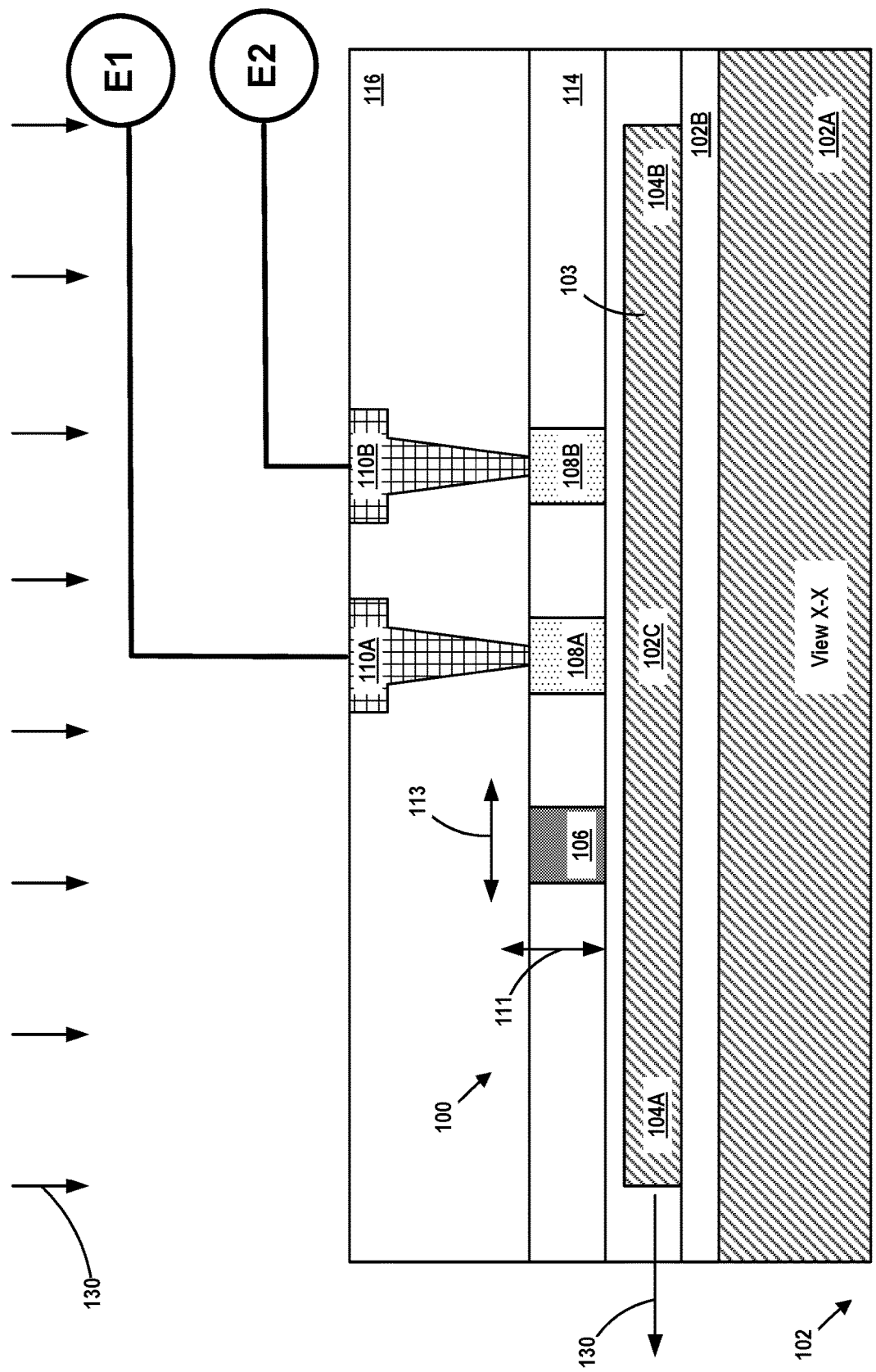

FIGS. 22 and 23 depict the illustrative example wherein the VOC antenna coupler element 108A is in the insulator state and the VOC antenna coupler element 108B is in the metallic state. With the VOC antenna coupler elements 108 in such states, a substantial portion and perhaps all of the incident light 130 (see FIG. 23) that hits the optical antenna coupler 100 and is scattered by the optical antenna coupler 100 will be directed out of the optical antenna coupler 100 via the waveguide 104A, while little if any of the incident light will be directed out of the waveguide 104B. This occurs because the VOC antenna coupler element 108B in its metallic state and the lateral distance or spacing between the antenna coupler element 106 and the VOC antenna coupler element 108A is relatively large. Thus, in this case, the interference of the scattered light waves results in generation of a substantially unidirectional light toward the left where it ultimately exits the optical antenna coupler 100 via the waveguide 104A.

As will be appreciated by those skilled in the art after a complete reading of the present application, the optical antenna coupler 100 is reconfigurable in the sense that incident light may be directed out of one of the waveguides 104A or 104B depending upon the state of the VOC material in the VOC antenna coupler element(s) 108. This provides product designers with flexibility to direct the routing of the light 130 within the IC products. In some situations, it may desirable to direct the light 130 out of the waveguide 104A to various optical circuits that are operatively coupled to or adapted to receive light 130 from the waveguide 104A. In other situations, it may desirable to direct the light 130 out of the waveguide 104B to various optical circuits that are operatively coupled to or adapted to receive light 130 from the waveguide 104B. Switching the direction the light 130 goes after it hits the optical antenna coupler 100 may be achieved by controlling the states (metallic or insulator) of VOC material of the VOC antenna coupler elements 108A, 108B. This switching of the direction of the light within the PIC product may be performed as often as needed or desired.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

The invention claimed is:

1. An optical antenna coupler, comprising:
   a base body, the base body comprising a first waveguide and a second waveguide; and
   a plurality of antenna coupler elements positioned above an upper surface of the base body that are adapted to be irradiated by an incident light, wherein the plurality of antenna coupler elements comprises at least one variable optical characteristics (VOC) antenna coupler element that comprises a VOC material, wherein the at least one VOC antenna coupler element is operatively coupled to a first energy source, the at least one VOC antenna coupler element being adapted to be transitioned from a metallic state to an insulator state and vice versa, wherein, in the metallic state, substantially all of the incident light is directed out of the optical antenna coupler via the first waveguide while substantially no amount of the incident light is directed out of the optical antenna coupler via the second waveguide and wherein, in the insulator state, substantially all of the incident light is directed out of the optical antenna coupler via the second waveguide while substantially no amount of the incident light is directed out of the optical antenna coupler via the first waveguide.

2. The optical antenna coupler of claim 1, wherein the at least one VOC antenna coupler element comprises a phase-change material and wherein the at least one VOC antenna coupler element is adapted to be maintained in the metallic state or transitioned from the insulator state to the metallic state by application of an energy from the first energy source to the at least one VOC antenna coupler element.

3. The optical antenna coupler of claim 1, wherein the at least one VOC antenna coupler element comprises a transparent conducting oxide (TCO) material and wherein the at least one VOC antenna coupler element is adapted to be maintained in the insulator state or transitioned from the metallic state to the insulator state by application of an energy from the first energy source to the at least one VOC antenna coupler element.

4. The optical antenna coupler of claim 1, wherein all of the plurality of antenna coupler elements comprise the same VOC material.

5. The optical antenna coupler of claim 1, wherein all of the plurality of antenna coupler elements comprise a same phase-change material or a same transparent conducting oxide (TCO) material.

6. The optical antenna coupler of claim 1, wherein at least one of the plurality of antenna coupler elements comprises one of silicon, polysilicon, amorphous silicon, silicon nitride, a metal-containing material, a substantially pure metal or a dielectric material having a refractive index that falls within the range of about 1.8-5 at a wavelength of 1.31 μm.

7. The optical antenna coupler of claim 2, wherein the phase-change material comprises at least one of a chalcogenide alloy, a material comprising Ge—Sb—Te (GST), $GS2Sb_2Te_5$, a material comprising Ge—Sb—Se—Te (GSST), $GS2Sb_2Se_4TS1$, $VO_2$, ITO, graphene or $MoS_2$, and the base body comprises at least one of crystallized silicon, polysilicon, amorphous silicon, a metal-containing material, a substantially pure metal, silicon nitride, a dielectric material with a refractive index that falls within the range of about 1.8-5 at a wavelength of 1.31 μm.

8. The optical antenna coupler of claim 1, wherein at least one of the plurality of antenna coupler elements comprises a non-phase change material.

9. The optical antenna coupler of claim 8, wherein the base body and the at least one of the plurality of antenna coupler elements comprised of the non-phase-change material are made of a same material.

10. The optical antenna coupler of claim 1, wherein the plurality of antenna coupler elements are positioned on and in contact with the upper surface of the base body.

11. The optical antenna coupler of claim 1, wherein the first energy source is adapted to supply one of an electrical voltage, an electrical current, a thermal energy or an optical energy to the at least one VOC antenna coupler element.

12. An optical antenna coupler, comprising:
   a base body, the base body comprising a first waveguide and a second waveguide;
   a plurality of antenna coupler elements positioned above an upper surface of the base body that are adapted to be irradiated by an incident light, wherein the plurality of antenna coupler elements comprises a first variable optical characteristics (VOC) antenna coupler element that comprises a first VOC material and a second variable optical characteristics (VOC) antenna coupler element that comprises a second VOC material;
   a first energy source that is operatively coupled to the first VOC antenna coupler element and adapted to apply a first energy to the first VOC antenna coupler element; and
   a second energy source that is operatively coupled to the second VOC antenna coupler element and adapted to apply a second energy to the second VOC antenna coupler element, wherein the optical antenna coupler is adapted to be positioned in first and second operational states, wherein, in the first operational state, substantially all of the incident light is directed out of the optical antenna coupler via the first waveguide while substantially no amount of the incident light is directed out of the optical antenna coupler via the second waveguide and wherein, in the second operational state, substantially all of the incident light is directed out of the optical antenna coupler via the second waveguide while substantially no amount of the incident light is directed out of the optical antenna coupler via the first waveguide.

13. The optical antenna coupler of claim 12, wherein the first VOC antenna coupler element comprises a first phase-change material and the second VOC antenna coupler element comprises a second phase-change material, wherein the first VOC antenna coupler element and the second VOC antenna coupler element, respectively, are adapted to be maintained in a metallic state or transitioned from an insulator state to the metallic state by application of an energy from the first and second energy sources, respectively, to the first and second VOC antenna coupler elements, respectively.

14. The optical antenna coupler of claim 12, wherein the first VOC antenna coupler element comprises a first transparent conducting oxide (TCO) material and the second VOC antenna coupler element comprises a second transparent conducting oxide (TCO) material, wherein the first VOC antenna coupler element and the second VOC antenna coupler element, respectively, are adapted to be maintained in an insulator state or transitioned from a metallic state to the insulator state by application of an energy from the first and second energy sources, respectively, to the first and second VOC antenna coupler elements, respectively.

15. The optical antenna coupler of claim 12, wherein the first and second VOC materials are a same VOC material.

16. The optical antenna coupler of claim 12, wherein all of the plurality of antenna coupler elements comprise the same VOC material.

17. The optical antenna coupler of claim 12, wherein all of the plurality of antenna coupler elements comprise a same phase-change material or a same transparent conducting oxide (TCO) material.

18. The optical antenna coupler of claim 12 wherein at least one of the plurality of antenna coupler elements comprises one of silicon, polysilicon, amorphous silicon, silicon nitride, a metal-containing material, a substantially pure metal or a dielectric material having a refractive index that falls within the range of about 1.8-5 at a wavelength of 1.31 µm.

19. The optical antenna coupler of claim 12, wherein, in the first operational state of the optical antenna coupler, the first VOC antenna coupler element is in a metallic state and the second VOC antenna element is in an insulator state and wherein, in the second operational state of the optical antenna coupler, the first VOC antenna coupler element is in an insulator state and the second VOC antenna element is in a metallic state.

20. An optical antenna coupler, comprising:
a base body, the base body comprising a first waveguide and a second waveguide;
a plurality of antenna coupler elements positioned above an upper surface of the base body that are adapted to be irradiated by an incident light, wherein the plurality of antenna coupler elements comprises:
a first variable optical characteristics (VOC) antenna coupler element that comprises a first VOC material;
a second variable optical characteristics (VOC) antenna coupler element that comprises a second VOC material; and
a third antenna coupler element comprised of one of silicon, polysilicon, amorphous silicon, silicon nitride, a metal-containing material, a substantially pure metal or a dielectric material having a refractive index that falls within the range of about 1.8-5 at a wavelength of 1.31 µm;
a first energy source that is operatively coupled to the first VOC antenna coupler element and adapted to apply a first energy to the first VOC antenna coupler element; and
a second antenna coupler element that is operatively coupled to the second VOC antenna coupler element and adapted to apply a second energy to the second VOC antenna coupler element, wherein the optical antenna coupler is adapted to be positioned in first and second operational states, wherein, in the first operational state, substantially all of the incident light is directed out of the optical antenna coupler via the first waveguide while substantially no amount of the incident light is directed out of the optical antenna coupler via the second waveguide and wherein, in the second operational state, substantially all of the incident light is directed out of the optical antenna coupler via the second waveguide while substantially no amount of the incident light is directed out of the optical antenna coupler via the first waveguide.

* * * * *